United States Patent [19]

Mintzlaff

[11] Patent Number: 4,858,039
[45] Date of Patent: Aug. 15, 1989

[54] STREAMING TAPE DRIVE WITH DIRECT BLOCK ADDRESSABILITY

[75] Inventor: Roger G. Mintzlaff, Santa Ana, Calif.

[73] Assignee: Archive Corporation, Costa Mesa, Calif.

[21] Appl. No.: 152,384

[22] Filed: Feb. 4, 1988

[51] Int. Cl.$^4$ .............................................. G11B 21/12
[52] U.S. Cl. ................................... 360/72.2; 360/74.1; 360/78.02
[58] Field of Search ...................... 360/69, 72.1, 72.2, 360/74.1, 78.02

[56] References Cited

U.S. PATENT DOCUMENTS

| | | | |
|---|---|---|---|
| 4,321,632 | 3/1982 | Leis et al. | 360/49 |
| 4,414,593 | 11/1983 | Miller et al. | 360/74.1 |
| 4,500,965 | 2/1985 | Gray | 360/55 X |
| 4,541,019 | 9/1985 | Precourt | 360/15 |
| 4,558,380 | 12/1985 | Porter | 360/53 |

OTHER PUBLICATIONS

Brochure-Archive Corporation, Viper 125, Bulletin 1530-10/86, Viper 60, Bulletin 1520-10/86.
Manual-Irwin Magnetic Systems, Inc., Tape Drive Oem Manual, May 1985, A copy of title page, copyright page, table of contents, pp. 1-1 through 1-5 of Chapter 1 and Chapters 3 and 5.

Primary Examiner—John H. Wolff
Attorney, Agent, or Firm—Knobbe, Martens, Olson and Bear

[57] ABSTRACT

A streaming tape drive for use in computer systems for the storage and retrieval of data on magnetic tape has the capability of locating a selected block of data stored on magnetic tape in serpentine fashion by first moving the magnetic head of the tape drive from one data track to another data track until the head is positioned to a data track which has a data block having a block number that is within a predetermined numeric value of the block number of the selected data block for which tape drive is searching. After the head is so moved to the data track, the tape drive performs a sequential search of the tape on a block-by-block basis until the selected data block is found. The tape drive has the capability to perform such searches on magnetic tape that is recorded in standard serpentine fashion, and no special tape recording format is required.

26 Claims, 21 Drawing Sheets

STREAMING TAPE DRIVE WITH DIRECT BLOCK ADDRESSABILITY

BACKGROUND OF THE INVENTION

The present invention is directed towards a streaming tape drive for a computer system, and more particularly towards a streaming tape drive which can access data recorded on magnetic tape in a streaming manner on a block-by-block basis without searching the entire length of the tape.

Streaming tape drives are used in computer systems to store digital data on magnetic tape. Data is recorded on the magnetic tape in a serial fashion along a plurality of substantially parallel data tracks which run the length of the tape. When one data track has been fully recorded, the direction of the tape is reversed, and another data track is recorded in the opposite direction. This bidirectional movement of the tape over the magnetic head obviates the need for rewinding the tape after each track is recorded. This back and forth recording of data along a plurality of data tracks one at a time is known as "serpentine" recording.

Streaming tape drives are advantageous in that the serpentine method of recording allows for the storage of a relatively large amount of data on the magnetic tape cartridges that are used in streaming drives. A single tape cartridge recorded in serpentine fashion may hold hundreds of megabytes of data. Another advantage resulting from the use of streaming tape drives is that the tape cartridges produced are portable and can be easily transferred from one computer to another. In contrast, floppy disks, or diskettes, which are also easily transportable, typically have capacities on the order of hundreds of kilobytes. Hard disks used in computers have a relatively large storage capacity, but cannot be easily transported from one computer to another.

While streaming tape drives produce large capacity tape cartridges, they typically have poor performance in the retrieval of selected portions of data which results from the fact that the data stored on a serpentine tape cartridge is essentially a single, long data track of serially recorded data. In the past, in order to retrieve a selected portion of data, streaming tape drives have searched the entire data string for the presence of the selected portion of data. For example, if the magnetic read/write head of the tape drive happened to be on the first data track, or track 0, and a selected portion of data was recorded on the seventh data track, or track 6, the tape drive would search each of the intervening data tracks in their entirety in sequential fashion to locate the selected data. Thus, the drive would search track 0, and then track 1, and then track 2, and so on, until it found the selected data on track 6.

Because of this time-consuming search process, streaming tape drives have typically been used only as backup storage devices. One such typical application is to store the entire contents of a hard disk onto a streaming tape cartridge at the end of the day. This application takes advantage of the large storage capacity of the tape cartridges and avoids the disadvantage of the long data retrieval time since data is only being written to the tape and not read from the tape. In the somewhat unusual circumstance of a hard disk failure, the entire data content of the hard disk that is lost may then be retrieved from the tape cartridge.

However, the use of streaming tape drives only as backup storage devices does not take full advantage of the large storage capacities of magnetic tape recorded in serpentine fashion and the portable nature of magnetic tape cartridges.

SUMMARY OF THE INVENTION

The invention is directed towards a streaming tape drive with direct block addressability, which is the capability to locate the position of a selected data block on magnetic tape recorded in serpentine fashion without having to search the entire length of the tape. As a result of this capability, the time required for the tape drive to retrieve a selected data block is dramatically reduced.

In one aspect of the invention, the position of a selected data block on magnetic tape is located with the use of a two-part search. The first part of the search for the desired data block is a track-to-track search during which the magnetic head is moved substantially vertically from one data track to another track until it locates a particular data track. This part of the search is performed by reading the block number of the data block to which the magnetic head is positioned and comparing the block number so read to the block number of the desired data block. If the numeric difference between the two block numbers exceeds a predetermined magnitude, the magnetic head is moved to a different data track. The magnetic head then reads a data block on the new data track and again compares its block number to the block number of the desired data block. If the difference in block numbers still exceeds a predetermined number, then the magnetic head is moved to a different data track, and so on.

This first part of the search continues until either a data block within a predetermined distance of the target data block is found or the distance from the target data block is minimized. This first part of the search is nonsequential since the magnetic head does not pass over or read every sequentially recorded data block in moving from one data track to another.

The second part of the search for the desired data block is performed after, as described above, the magnetic head has been positioned to a particular data track. During the second part of the search, the magnetic head reads the block numbers of each sequentially recorded data block until it locates the desired data block. This second part of the search is sequential since the magnetic head passes over and reads each sequentially recorded data block.

In another aspect of the invention, the tape drive has the capability to locate a desired block of data without having to search the entire length of a tape recorded in standard serpentine fashion. This aspect of the invention is advantageous in that magnetic tapes recorded in standard serpentine fashion can be used in connection with the invention. The "compatibility" of the invention with tapes recorded in standard serpentine fashion allows the use of the invention with preexisting tapes and also allows for broader use of the invention since no special tape format is necessary.

These and other objects, features, and advantages of the present invention will be apparent in view of the following detailed description of a preferred embodiment, which is explained with reference to the figures, a brief description of which is provided below.

DETAILED DESCRIPTION OF A PREFERRED EMBODIMENT

Figure 1:
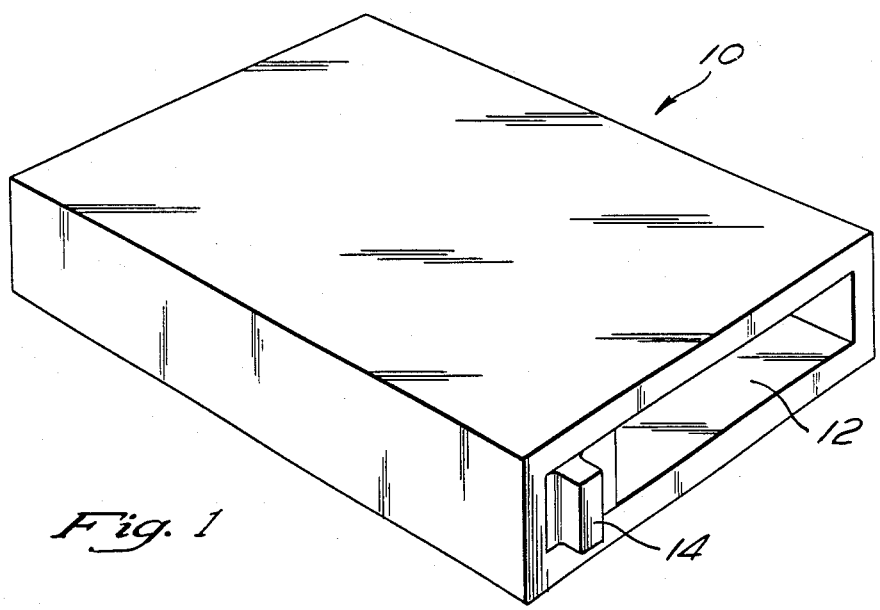
FIG. 1 is a perspective view of a streaming tape drive.

A streaming tape drive 10 is shown in FIG. 1. The tape drive 10 includes an opening 12 into which a tape cartridge is inserted into the drive 10 and a knob 14 for causing the magnetic read/write head of the tape drive to engage the tape for recording and reading data.

Figure 2:
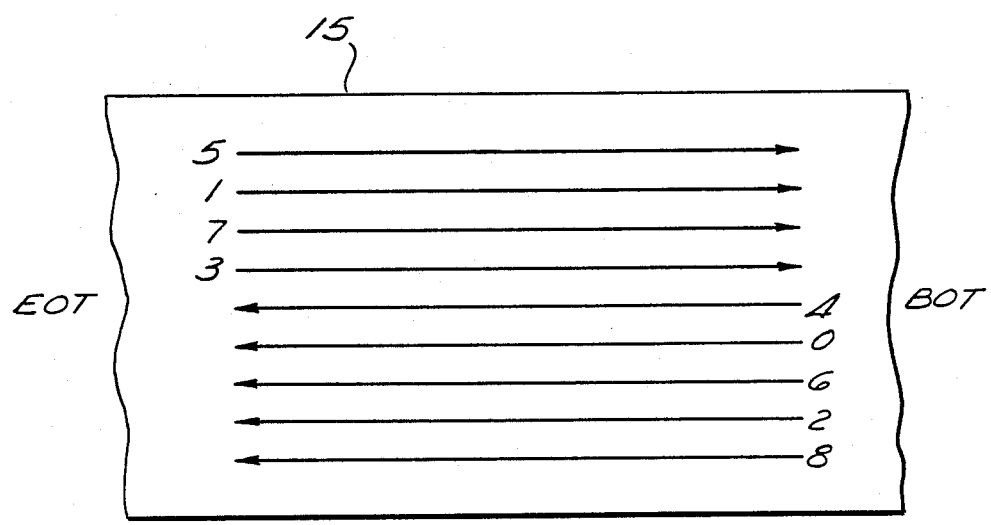
FIG. 2 is an illustration of a section of magnetic tape recorded in serpentine manner.

The tape drive 10 records data on magnetic tape cartridges in serpentine fashion. Now referring to FIG. 2, a portion of magnetic tape 15 is shown recorded in serpentine fashion. The tape 15 has nine substantially parallel data tracks. Data tracks 0, 2, 4, 6, and 8 are recorded from the beginning of tape (BOT) to the end of tape (EOT), and data tracks 1, 3, 5, and 7 are recorded in the opposite direction, from the end of tape to the beginning of tape. The data tracks are recorded in their numbered order; that is, track 0 is recorded first, track 1 is recorded next, etc. The even-numbered tracks are recorded in a direction opposite to the odd-numbered tracks so that the tape does not have to be rewound to record the next data track. While the tape 15 shown in FIG. 2 has nine data tracks, magnetic tape recorded in serpentine fashion may have up to 20 data tracks or more.

Figure 3:
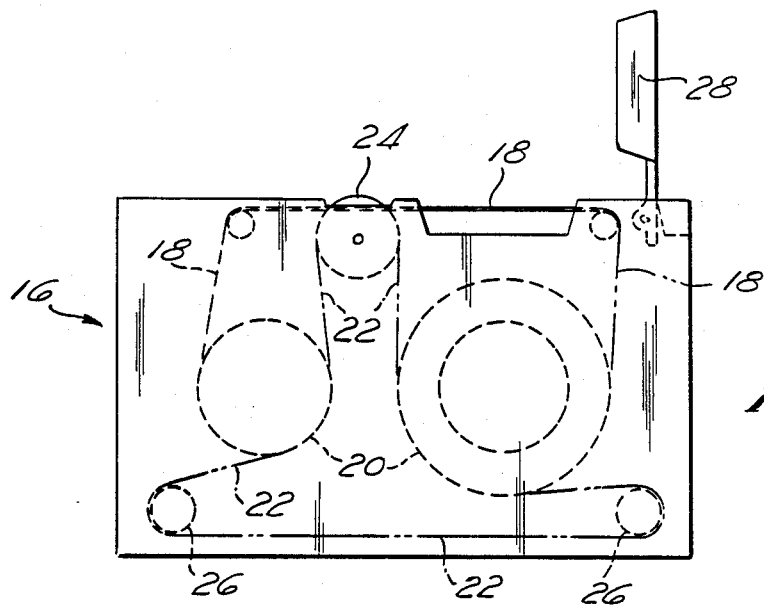
FIG. 3 is a top view of a tape cartridge usable in the streaming tape drive of FIG. 1.

A tape cartridge 16 is shown in FIG. 3. A length of magnetic tape 18, which may be up to 600 feet in length, is wound within the cartridge 16 on a pair of rotatable reels 20. A drive belt 22 is wound around a capstan 24 and a set of rollers 26 and makes contact with the reels 20. Rotation of the capstan 24 causes the belt 22 to turn the reels 20 and thus the tape wound onto the reels 20. The tape cartridge 16 also includes a hinged door 28 that automatically opens to allow the magnetic head to engage the tape upon insertion of the cartridge 16 into the tape drive 10.

Figure 4:
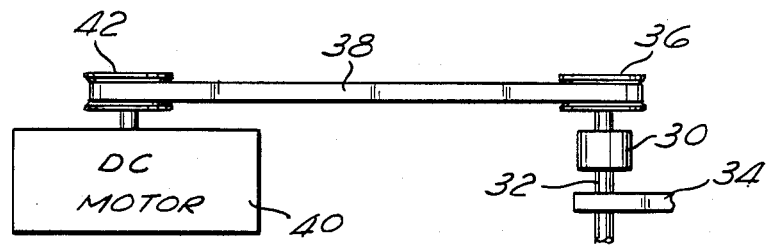
FIG. 4 is a side elevational view of a motor drive assembly that drives the magnetic tape across the magnetic head of the streaming tape drive of FIG. 1.

The capstan 24 is driven by means of a capstan drive roller 30 which engages the capstan 24 when the tape cartridge 16 is inserted in the tape drive 10 and the knob 14 is moved so that the magnetic read/write head engages the tape. Now referring to FIG. 4, the drive roller 30 is mounted on an axle 32 rotatably fixed to the tape drive 10 by a plate 34. A flanged pulley 36 is mounted on the top of the axle 32, and the pulley 36 is driven by a belt 38 connected to a DC motor 40 by means of a second flanged pulley 42. In operation, the DC motor 40 effects the rotation of the capstan drive roller 30 by means of the belt 38 and the pulley 36, and as a result, the magnetic tape 18 is driven across the magnetic head for data recording and retrieval or for purposes of rewinding or fast forwarding the tape.

The magnetic tape used in streaming cartridge systems is typically one-fourth of an inch in width and may be up to 600 feet or more in length. There may be twenty parallel data tracks or more recorded between the edges of the quarter-inch tape. In order to access each of these tracks to read or write data, the magnetic read/write head must be precisely positioned over each track. If the magnetic head is not accurately positioned over the proper data track, data transmission errors may occur from reading data from the wrong track or writing data on the wrong track, which may result in a loss of data.

Figure 5:
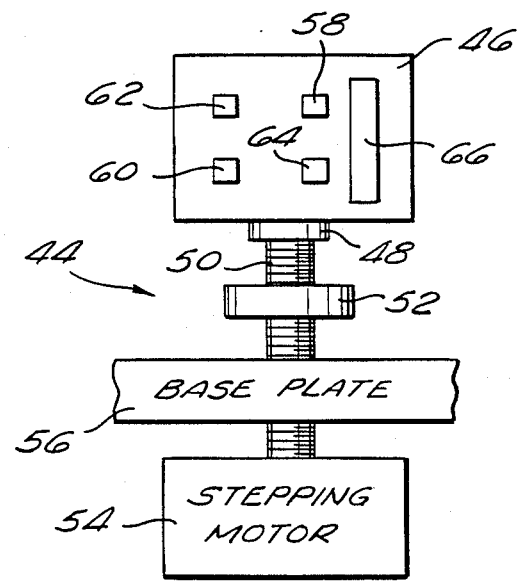
FIG. 5 is a side elevational view of a motor drive assembly that moves the magnetic head of the tape drive to various serpentine data tracks recorded on the magnetic tape.

These precise positioning requirements are accomplished with the use of a stepping motor. FIG. 5 illustrates a magnetic read/write head and stepping motor assembly 44 used in the tape drive 10. The assembly 44 comprises a magnetic read/write head 46, a coupler 48, a lead screw 50, a collar 52 and a stepping motor 54. The magnetic head 46 is coupled to the lead screw 50 so that the vertical position of the head 46 can be adjusted by the rotation of the screw 50, which is controlled by the stepping motor 54. The portion of the lead screw 50 between the collar 52 and the motor 54 passes through a base plate 56 connected to the tape drive 10.

The base plate 56 is used as a mechanical stop, or reference point, from which a variety of head positions may be measured as a number of discrete steps of the stepping motor 54. The base plate 56 cooperates with the collar 52 to provide this capability. The collar 52 is fixed with respect to and rotates with the lead screw 50. The head 46 can be considered to be at its reference point, or "at home," when the bottom surface of the collar 52 is flush with the base plate 56.

Each step, or angular rotation, of the stepping motor 54 causes the lead screw 50 to raise or lower the head a fixed amount, depending upon the direction of rotation. Thus, distances can be measured as a number of steps. The distance the head 46 moves per step depends upon the particular stepping motor, lead screw and head coupling mechanism used. In one embodiment of the invention, the head 46 is moved one-thousandth of an inch per step.

If it is known that a particular location lies a certain distance from home, this location can be reached by first moving the head 46 to the home position and then stepping the motor 54 through the number of steps corresponding to the distance from home. The tape drive 10 keeps track of the current step position and finds a desired position by calculating the difference in the number of steps to the desired position from the current position. This positioning of the magnetic head is conventional and is necessarily performed by all streaming tape drives.

The magnetic head 46 has two read heads 58, 60, two write heads 62, 64 and an erase head 66. When data is recorded on magnetic tape by the head 46, the data is first written by one of the write heads 62, 64 and subsequently read by one of the read heads 58, 60 to check the integrity of the newly written data. When magnetic tape passes over the head 46 in FIG. 5 from left to right, the tape may be written by the upper write head 62 and subsequently read by the upper read head 58 to check the data for accuracy. When a new data track is to be recorded and the tape passes over the head 46 in the opposite direction, from right to left, the lower write head 64 may write data to the tape while the read head 60 subsequently checks it for accuracy.

Tape Drive Electronics

Figure 6:
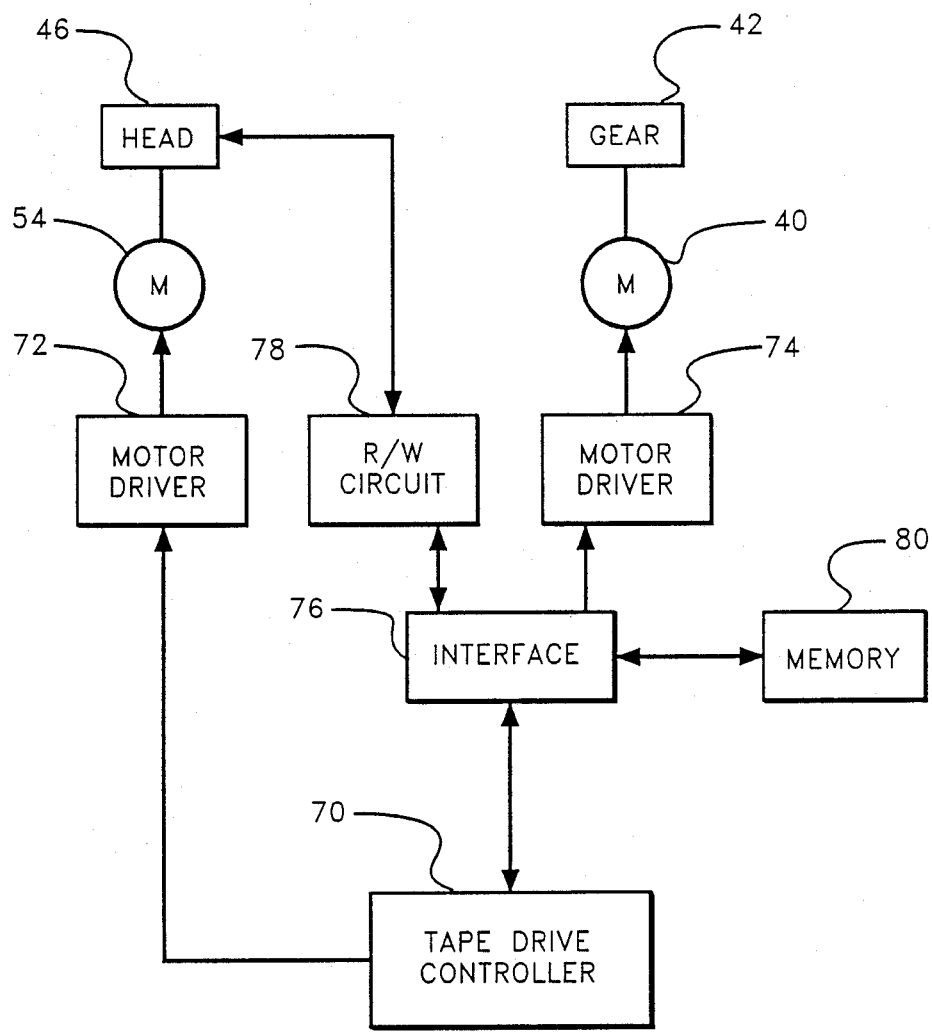
FIG. 6 is a block diagram of the electrical circuitry of the streaming tape drive of FIG. 1.

A block diagram of the electronics of the tape drive 10 is shown in FIG. 6. The heart of the electronics and of the invention is a tape drive controller 70 that controls all of the overall operations of the tape drive 10. The tape drive controller 70 controls the operation of the stepping motor 54 via a conventional motor driver 72, which may be the driver disclosed in U.S. Pat. No. 4,717,866, issued to Gray and assigned to the assignee of the present invention. The disclosure of U.S. Pat. No. 4,717,866 is incorporated herein by reference.

The capstan motor 40 is controlled by the tape drive controller 70 in a conventional manner via a motor driver 74 through an interface circuit 76. The motor driver 74 may include a conventional servo feedback circuit. As described below, the motor 40 includes a built-in tachometer that generates a fixed and predetermined number of tachometer pulses for each revolution of the motor 40. The tachometer pulse signal may be fed to a comparator circuit having a second input that is connected to receive a crystal-controlled reference frequency. The comparator circuit may then output an error signal if there is any deviation of the motor speed indicated by the tachometer signal from the reference frequency. The error signal may be fed to a pulse-width modulated amplifier that drives the motor 40.

Data is recorded on and read from the tape via a conventional read/write circuit 78 through the interface circuit 76. The read/write circuit 78 may include the circuit disclosed in U.S. Pat. No. 4,644,420 issued to Buchan and assigned to the assignee of this invention. The disclosure of U.S. Pat. No. 4,644,420 is incorporated herein by reference. Finally, the tape drive 10 includes a memory 80 connected to the tape drive controller 70 via the interface circuit 76.

The interface circuit 76 is a custom VLSI integrated circuit chip which is included in Viper ® tape drives commercially available from the assignee of the present invention. The specific details of the interface circuit 76 as well as the motor driver circuit 72, read/write circuit 78, motor driver circuit 74, and memory 80 are not important to the invention. Many different embodiments of these circuits could be used to practice the invention described herein, and preexisting commercially available tape drives incorporate similar circuits.

In the following description, where an asterisk (*) follows a signal name, for example PSEN*, the signal is active if it is logic 0, or has a relatively small voltage, for example 0.5 volts, and the signal is inactive if it is logic 1, or has a relatively large voltage, for example 4.5 volts. If a signal name is not followed by an asterisk, the signal is active when it is logic 1 as defined above and inactive when it is logic 0 as defined above. In the drawings, an overstrike above a signal name is equivalent to the use of an asterisk; if a signal name includes an overstrike, the signal is active when logic 0 and if a signal name does not include an overstrike, the signal is active when logic 1.

Figure 7:
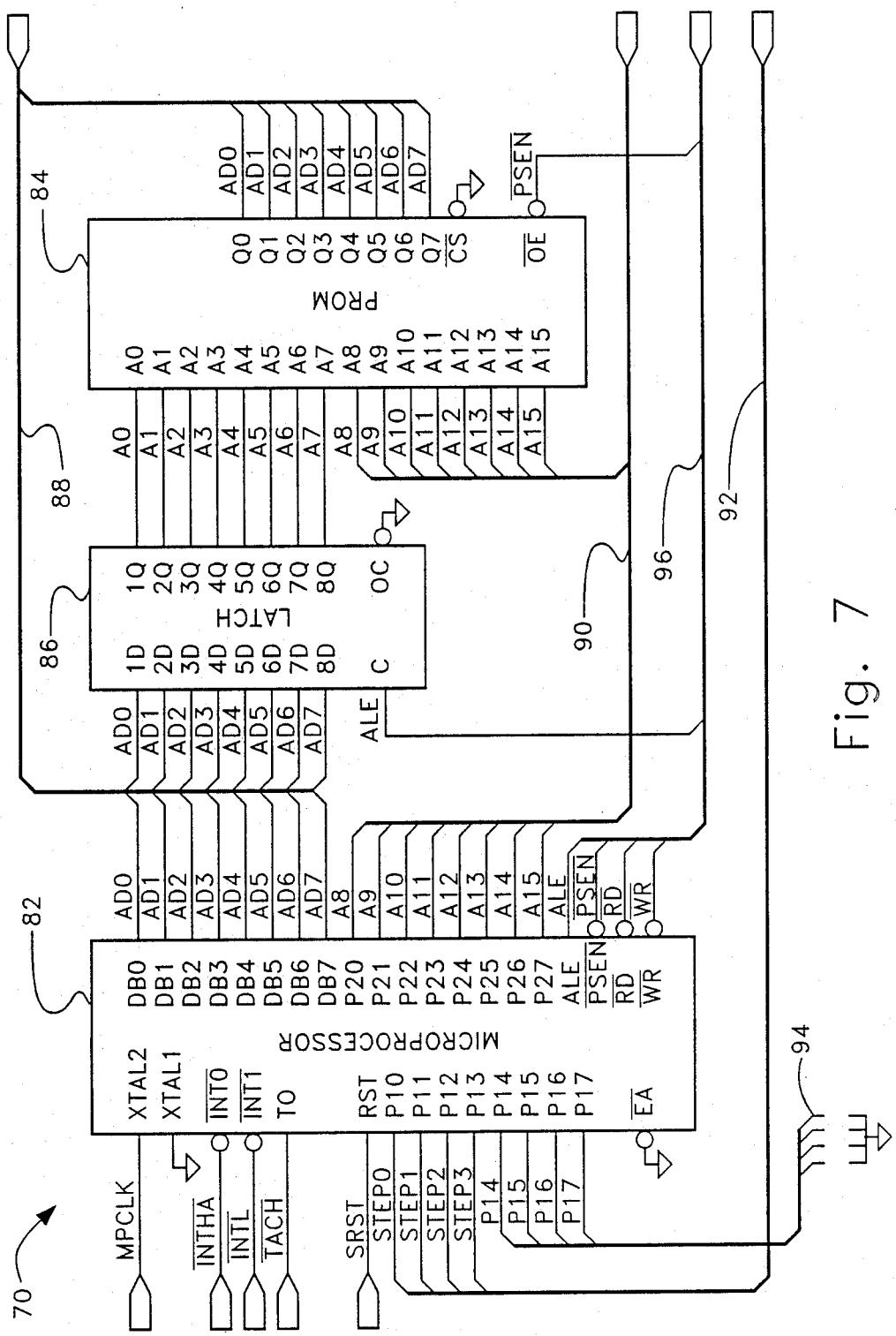
FIG. 7 is a circuit diagram of the tape drive controller shown schematically in FIG. 6.

Now referring to FIG. 7, a circuit diagram of the tape drive controller 70 is shown and includes a microprocessor 82 connected to a programmable read-only memory (PROM) 84 via a latch 86. The microprocessor may be a conventional microprocessor such as an 8031 commercially available from Intel; the latch may be a conventional latch such as a 74ALS373 commercially available from Motorola; and the PROM may be a conventional PROM such as a 27512 commercially available from Intel. The microprocessor 82, latch 86, and PROM 84 are interconnected to each other by a time-multiplexed address/data bus 88. The microprocessor 82 and PROM 84 are also interconnected by a high order address bus 90 connected to an eight bit data port of the microprocessor 82. The microprocessor 82 controls the latching of data by the latch 86 by means of an address latch enable (ALE) signal.

In operation, the microprocessor 82 fetches and executes the computer program instructions stored in the PROM 84 at a rate controlled by a microprocessor clock (MPCLK) signal generated by the interface circuit 76 and input to the oscillator input XTAL2 of the microprocessor 82. The address/data bus 88 is time multiplexed. During the first instruction fetch cycle of the microprocessor 82, the lower order address bits are transmitted to the address/data bus 88 to be temporarily stored in the latch 86. During the next instruction fetch cycle, the high order address bits A8-A15 are transmitted to the PROM 84 via the high order address bus 90. At the same time, the lower order address bits A0-A7 are transmitted from the latch 86 to the PROM 84. In response to the address so provided, the PROM 84 supplies the instruction to be executed by the microprocessor 82 on the address/data bus 88 for transmission to the microprocessor 82, which then executes the instruction.

The microprocessor 82 has another eight bit data port from which four signals, STEP0, STEP1, STEP2, and STEP3, are output to the motor driver 74 via a bus 92 to control the stepping motor 54. This data port also includes four signals, P14, P15, P16, and P17, that are generated by a set of jumpers 94 and input to the microprocessor 82 that are used to indicate to the microprocessor 82 the identification number of the tape drive so that one tape drive can be distinguished from another tape drive on a computer network. The P14, P15, P16, and P17 signals could also be used for other purposes.

The microprocessor 82 also includes a program store enable (PSEN*) signal that enables the output of the PROM 84 and signals the interface circuit 76 when the microprocessor 82 is reading the PROM 84. The ALE and PSEN* signals are transmitted to the interface circuit via a bus 96 along with a read (RD*) and a write (WR*) signal which control the reading and writing of data to the memory 80.

The microprocessor 82 also includes a reset (SRST) signal, a tachometer (TACH*) signal, a low-priority interrupt (INTL*) signal, and a high-priority interrupt (INTHA*) signal. The INTL* and INTHA* signals are conventional interrupt signals and each indicates to the microprocessor 82 that an interrupt has been generated and needs servicing. The use of such prioritized interrupt signals is conventional. The TACH* signal, which is input to the microprocessor 82 from the motor driver circuit 74, is generated by a conventional tachometer built into the capstan motor 40. The TACH* signal is thus indicative of the rotational speed of the motor 40 and also of the length of tape which has passed across the magnetic head 46 in any given amount of time. In the embodiment described herein, the tachometer generates four tachometer pulses for each data block stored on magnetic tape at a density of 10,000 flux transitions per inch.

In performing one of its functions, the microprocessor 82 acts as a comparator in order to compare the block number of the data block to which the magnetic head is currently positioned with the block number of the target data block being sought, as is described in more detail below in connection with the description of the computer program.

The particular type of microprocessor 82 used is not important to the practice of the invention; many different types of conventional microprocessors could be programmed to practice the present invention. Moreover, the present invention could be practiced without the use of a microprocessor by using standard, commercially available logic chips or specially programmed commercially available logic chips such as programmable logic arrays.

Figure 8:
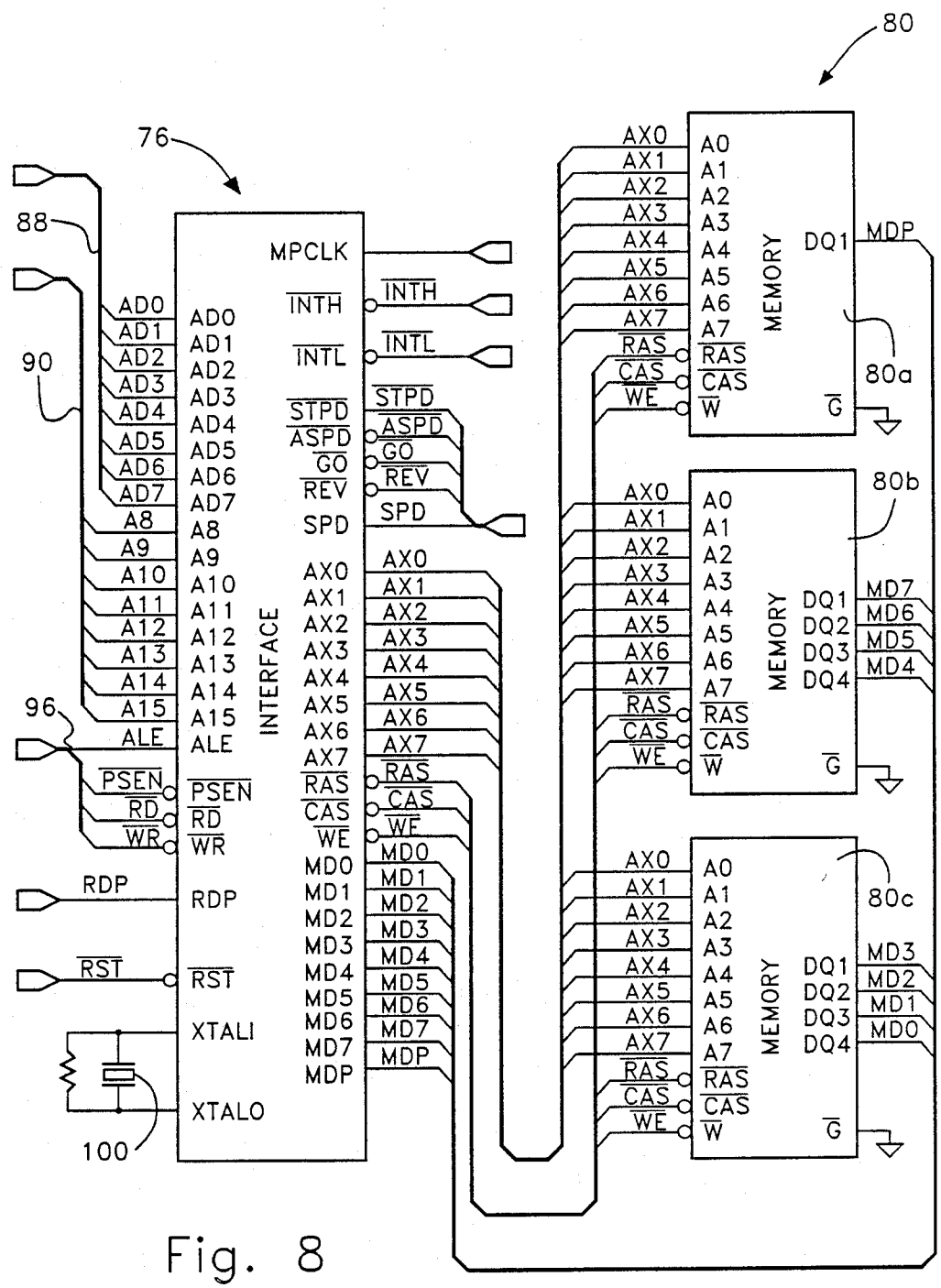
FIG. 8 is a diagram showing the interconnection of the interface circuit and the memory circuit shown schematically FIG. 6.

A diagram showing the interconnection of the interface circuit 76 and the memory 80 is shown in FIG. 8. The memory 80 includes three interconnected dynamic random access memory (DRAM) integrated circuits 80a, 80b, 80c. Each of the integrated circuits includes eight address lines A0-A7 to which the address signals AX0-AX7 are input from the interface circuit 76. Each of the memory circuits 80a, 80b, 80c also includes a row address select (RAS*) and a column address select (CAS*) signal as well as a write enable (WE*) signal from the interface circuit 76.

The memory circuit 80b includes four data lines MD0MD3 connected to the interface circuit 76; the memory circuit 80c includes four data lines MD4-MD7 connected to the interface circuit; and the memory circuit 80a includes one data line MDP connected to the interface circuit 76. The data written to and read from the magnetic tape is temporarily stored on a parallel basis via the memory lines MD0-MD7, with an extra bit added as a parity bit via the MDP line.

In order to write data to the memory circuits 80a, 80b, 80c, a row address is specified by the AX0-AX7 lines and an active RAS* signal, and then a column address is specified by the AX0-AX7 lines and an active CAS* signal. Upon an active WE* signal, the data input on the data lines MD0 MD7 and MDP is written to the memory 80 at the specified address. In order to read data, the memory circuit is addressed in the same manner, and the data stored at the specified address is supplied on the data lines MD0-MD7 and MDP.

The interface circuit 76, which is shown in the left-hand portion of FIG. 8, is driven by a crystal oscillator 100 connected to the XTALI and XTALO inputs of the interface circuit 76. The interface circuit 76 derives the MPCLK signal described above from the oscillator 100. The read signal (RDP) that is generated by the read/write circuit 78 and corresponds to the binary data read from the tape is input to the interface circuit 76 in a serial manner and is stored in the memory 80 by using the interface circuit outputs AX0-AX7, RAS*, CAS*, WE*, MD0-MD7, and MDP described above in connection with the memory 80.

The interface circuit 76 also includes a number of motor control signals used to control the operation of the capstan motor 40 via the motor driver circuit 74. These motor control signals include a stopped (STPD*) signal, an at speed (ASPD*) signal, a go (GO*) signal, a reverse (REV*) signal, and a speed (SPD) signal.

The STPD* signal is transmitted from the motor driver circuit 74 to the interface circuit 76 and when active, indicates that the motor 40 is stopped. The ASPD* signal is likewise transmitted from the motor driver circuit 74 to the interface circuit 76 and when active, indicates to the interface circuit 76 that the motor is "at speed," or has reached its steady state speed for streaming operation at which data is read from or written to the tape, which may correspond to a tape speed of 90 inches per second, for example.

The GO* signal is output from the interface circuit 76 to the motor driver circuit 74 and when active, causes the motor 40 to be driven at the speed selected by the SPD signal, which is also output from the interface circuit 76 to the motor driver circuit 74. One logic level of the SPD signal corresponds to one motor speed, for example, 90 inches per second, and the other logic level of the SPD signal corresponds to a second speed, for example, 72 inches per second.

The REV* signal is output from the interface circuit 76 to the motor driver circuit 74 and controls the direction of rotation of the motor 40, thus controlling the direction in which the tape is moved across the magnetic head 46. The interface circuit generates the INTL* signal and a conventional high-priority interrupt (INTH*) signal.

Finally, the interface circuit 76 is connected to the address/data lines AD0-AD7 on the bus 88 and the address lines A8-A15 on the bus 90 so that the microprocessor 82 may access the memory 80 via the interface circuit to retrieve the data stored in the memory 80 that was read from the tape. To this end, the microprocessor 82 transmits a 16 bit address signal via the AD0-AD7 and A8-A15 lines. The interface circuit 76 uses eight of these address bits as the row address of the memory 80 and the remaining eight bits as the column address of the memory 80, and returns the data located at the specified address to the microprocessor via the AD0-AD7 lines, with the parity bit MDP removed.

Overall Operation of the Preferred Embodiment

Figure 9:
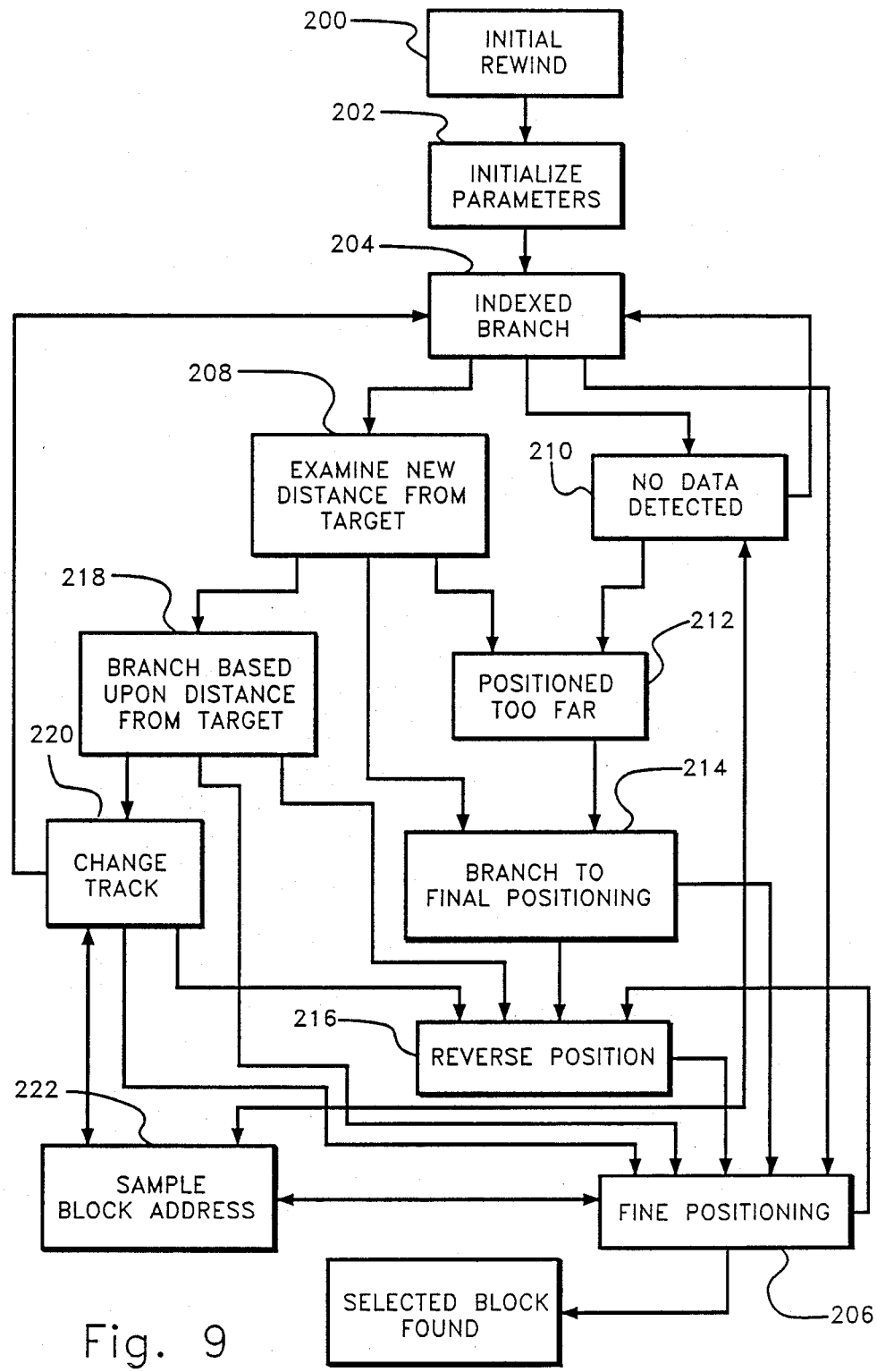
FIG. 9 is an overall flow chart of the portion of the computer program of the tape drive controller that facilitates locating a selected data block without searching the entire length of the tape.

An overall flow chart of the computer program used for searching and stored in the PROM 84 is illustrated in FIG. 9. When executed, the computer program causes the tape drive 10 to perform a search for a selected data block, which may be user selected or selected by the computer to which the tape drive is attached. "Selected" data block and "target" data block are used interchangeably herein and have the same meaning. They both mean the data block that is to be located by the tape drive.

The search includes a first substantially vertical, nonsequential search for a particular data track. The magnetic head is moved from track to track until either the magnetic head reads a data block that is within a predetermined distance of the target data block or the distance to the target data block is minimized. The distance to the target data block is minimized by comparing the current distance to the target data block with the previous distance to the target data block, and moving the magnetic head to the particular data track corresponding to the smaller distance. Once the magnetic head 46 has been positioned to the appropriate data track, a sequential search of the data blocks is made until the selected data block is located.

Now referring to FIG. 9, at step 200 the program determines whether the cartridge tape presently in the tape drive has been read since its insertion into the drive. If it has not been previously read, the tape is rewound and the magnetic head 46 is positioned to data track 0 so that the program can quickly determine if the tape happens to be completely unrecorded. Next, at step 202, a number of parameters used in the execution of the computer program are initialized. Then, at step 204, an indexed branch is performed on the basis of the distance between the current position of the magnetic head 46 and the selected data block. As set forth in detail below, this distance is determined as the numeric difference between the block number of the selected data block and the block number of the data block to which the magnetic head 46 is currently positioned.

As a result of the indexed branch at step 204, the program branches to one of three different steps. One possibility is that the distance is relatively small, indicating that current distance of the magnetic head 46 to the selected data block is small enough so that the tape drive can perform a sequential search for the selected data block without wasting an undue amount of time. In this case, the program branches to step 206 at which point the tape drive performs a sequential search for the selected data block. The program may also branch to step 208, during which the new distance from the selected data block, or target data block, is examined. The third step to which the program may branch from the indexed branch step 204 is step 210. The program branches to step 210 if no data was detected on the magnetic tape at the current position of the magnetic head 46. This would be the case if the tape were only partially recorded, leaving a number of blank data tracks, and the magnetic head 46 was positioned to one of the blank data tracks.

At the examine new distance from target step 208, the program makes a number of comparisons of the new distance from the target and the previous distance from the target. During the execution of the program, during the first nonsequential portion of the search for the selected data block, the magnetic head 46 is moved substantially vertically from track to track. After the head is moved to a new track, the block number of the data block at which the head is positioned is read, and the "new distance" from the target is calculated. By comparing this new distance with the previous distance from the target, certain assumptions concerning the location of the selected data block with respect to the position of the head 46 can be made. For example, if the sign of the new distance changed from that of the previous distance from the target, then the magnetic head 46, in changing data tracks, has skipped over the selected data block, and is thus positioned within one track of the selected data block. At the examine new distance from target step 208, both the sign and the magnitude of the new distance from the target data block are compared with those of the previous distance from target. As a result of these comparisons, the program branches to one of three steps.

One of these steps is a positioned too far step 212 to which the program branches if the magnetic head 46 has gone too far past the selected data block. During this step, the program causes the stepping motor to move back to its previous track since it has gone too far. The program branches to a branch to final positioning step 214 from step 212 when the head 46 has gone past the selected data block but has not gone too far past. During step 214, the distance from the current position of the head to the selected data block is checked to see whether it is positive or negative. If the distance is positive, then the head 46 is located "below" the selected data block, "below" meaning a data block having a smaller block number than the target data block, and the program branches to the fine positioning step 206 during which the program finds the selected data block by performing a sequential read of data block numbers. If the distance is negative, then the head 46 has passed the selected data block, and the tape must be rewound so that the head is located below the selected data block. This occurs during the reverse position step 216.

The third step to which the program branches from the examine new distance from target step 208 is a branch based upon distance from target step 218. During this step, the program compares the current distance of the magnetic head 46 to the target with predetermined numeric values. If the head 46 is still a long way from the target data block, then the program branches to a change track step 220 at which the head 46 is moved to a different data track. If the head is close to the target data block, then the program branches either to the reverse position step 216 or the fine positioning step 206, depending upon whether the magnetic head 46 is located above or below the target data block.

During the change track step 220, the program moves the head 46 to a different data track, depending upon the sign of the distance to the target data block. The program also "looks ahead" to determine whether the head can be moved to a different data track in the lower direction. For example, if the head has been moved from track 2 to track 1 and has just been moved to track 0, the program examines the current track number, which is track 0, and determines that the head cannot be moved any further in that direction, since there are no data tracks that are numerically lower than track 0. As a result of this look ahead process, if the head 46 cannot be moved to a numerically lower data track, then the program branches to the fine positioning step 206. If the head can be moved further in the lower direction, then the program calls a sample block address subroutine 222 during which the block number of the data block to which the head is currently positioned is read, and then the program branches back to step 204.

The fine positioning step 206 performs a sequential search for the selected data block by comparing the block numbers of the data blocks as read in the sample block address subroutine 222 with the block number of the target data block. When the bloc number of the data block to which the magnetic head 46 is currently positioned matches the block number of the target data block, the target data block has been found and the execution of the program ends.

During the sample block address subroutine 222, the magnetic head 46 reads the block number of the data block to which the head is currently positioned so that the program can determine the current position of the magnetic head 46 with respect to the target data block and branch accordingly.

If the program branched to the no data detected step 210 from the indexed branch step 204, then the program checks to make sure that the tape currently in the drive is not completely unrecorded. Assuming that the tape is recorded, the program branches to the positioned too far step 212 described above since the magnetic head 46 has been moved beyond the end of the recorded data on the tape.

It should be noted that in the preferred embodiment described herein, the second "sequential" portion of the search is strictly sequential in that each numerically higher data block is read and tested to determine whether it is the target data block. It should be understood, however, that such a strictly sequential search is not necessary to practice the invention. Instead of a strictly sequential search, a substantially sequential search may be used instead in which every other data block or every fifth data block, for example, is tested to determine whether it is the target data block.

Detailed Operation of the Preferred Embodiment

Figure 10:
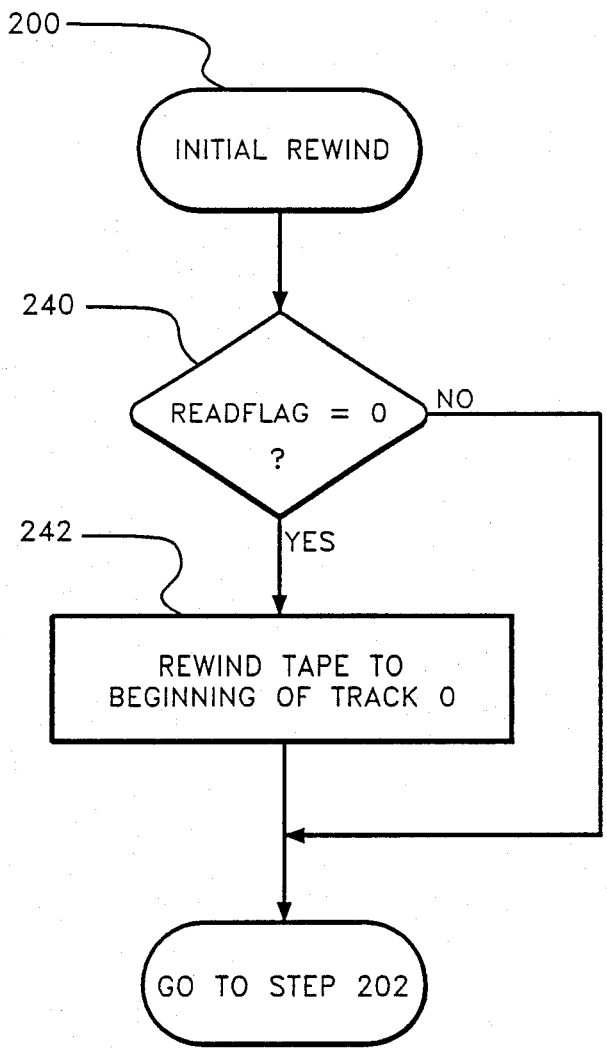
FIG. 10 is flow chart a of the initial rewind step shown generally in FIG. 9.

A detailed flow chart of the initial rewind step 200, which is shown generally in FIG. 9, is shown in FIG. 10. The purpose of the initial rewind step 200 is to rewind the tape in case the tape has not been previously read by the tape drive 10. The rewinding of the tape guarantees that the magnetic head 46 will be positioned to a data block if the tape has been previously recorded. At step 240, a READFLAG variable is tested to determine whether it is zero. This READFLAG variable is used to keep track of whether the tape currently inserted into the tape drive has been read after its insertion. The READFLAG variable is reset to zero when a tape is inserted into the tape drive, when the power to the tape drive is turned on, and when the tape drive is reset. If the READFLAG is zero as determined at step 240, indicating that the current tape has not been previously read, then the tape is rewound to the beginning of track 0, which is the point at which the recorded data begins on the tape. The program then branches to the initialize parameters step 202. If the READFLAG variable is not zero, indicating that the tape has been previously read, then the program branches to step 202 without rewinding the tape.

Figure 11:
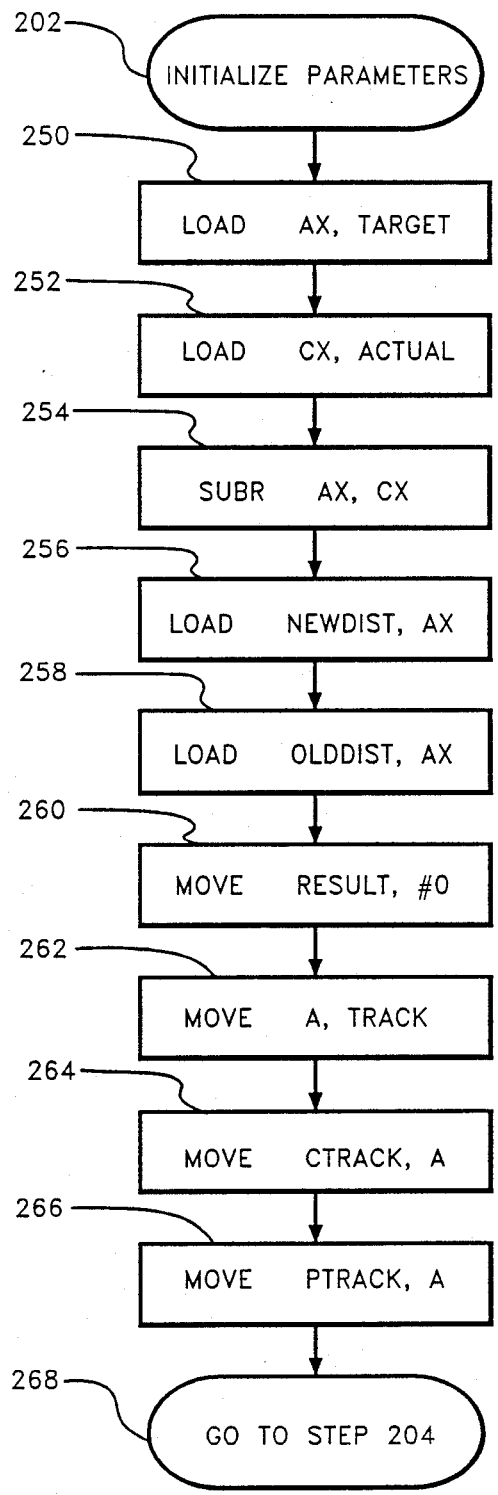
FIG. 11 is a flow chart of the initialize parameters step shown generally in FIG. 9.

A detailed flow chart of the initialize parameters step 202, which is shown generally in FIG. 9, is shown in FIG. 11. The initialize parameters step is performed once each time the search program is executed in order to find a selected block of data. Now referring to FIG. 11, at step 250, the numeric value of TARGET is loaded into AX, which is a software register. TARGET contains the block number of the data block that is to be located by the computer program. Then at step 252, the numeric value of ACTUAL is loaded into CX, which is another software register. ACTUAL contains the block number of the data block to which the magnetic head 46 is currently positioned. At step 254, the contents of the CX register are subtracted from the contents of the AX register. As a result, the AX register contains the distance from the current position of the magnetic head 46 to the selected data block. This distance, which is the difference in block numbers, may be positive or negative. For example, if the magnetic head 46 was positioned on track 0 and the selected data block was located on track 3, the distance would be positive, since the block number of the selected data block would be larger than the block number of the data block to which the head was currently positioned. Conversely, if the magnetic head 46 was positioned on track 3 and the selected data block was located on track 0, the distance would be negative, since the block number of the selected data block would be less than the block number of the data block to which the head was currently positioned.

At step 256, this distance stored in AX is moved to a variable NEWDIST, which represents the most recently calculated distance to the target data block. At step 258, this distance is also move to the variable OLDDIST, which represents the previous distance to the target. Since no previous distance has been calculated prior to this initialization step 202, OLDDIST is set to the current distance from the target block.

At step 260, a RESULT variable is set to zero. This numeric value stored in this RESULT variable determines which step that the program will branch to during the indexed branch step 204. When RESULT is zero, the program is forced to branch to the examine new distance from target step 208 from step 204.

At step 262, the current track to which the magnetic head 46 is positioned is moved to the A variable. Then, at step 264, the contents of A are moved to the CTRACK variable, and at step 266, the contents of A are moved to the PTRACK variable. The CTRACK variable maintains the number of the current data track to which the magnetic head 46 is positioned, and the PTRACK variable maintains the number of the previous track to which the magnetic head 46 was positioned. In this case, PTRACK is initialized to the numeric value of the current track as stored in TRACK since the program is being initialized and the magnetic head 46 has not been previously positioned during this search. Finally, at step 268, the initialization process ends and the program branches to the indexed branch step 204.

Figure 12:
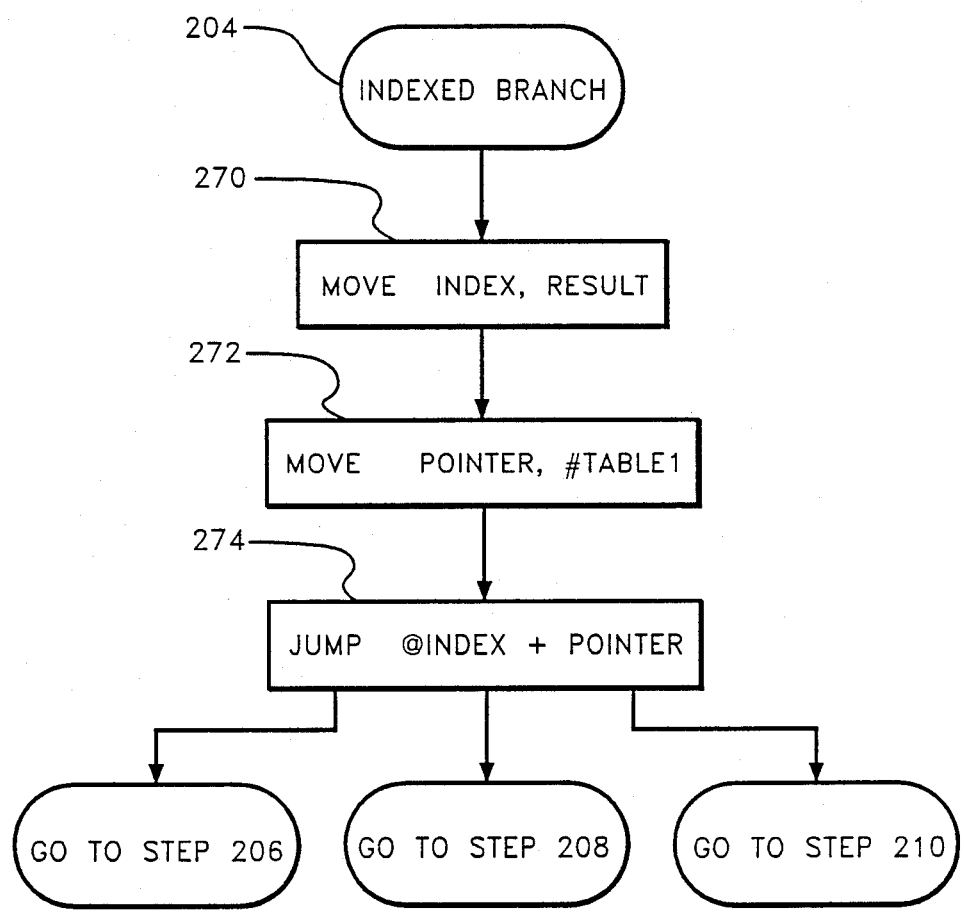
FIG. 12 is a flow chart of the indexed branch step shown generally FIG. 9.

A detailed flow chart of the indexed branch step 204, which is shown generally in FIG. 9, is shown in FIG. 12. This portion of the computer program causes an indexed branch to be performed, based upon the numeric value of the RESULT variable, which depends upon the current distance of the magnetic head 46 from the target data block. Such indexed branches, which are conventionally used in computer programs, use a pointer to a base address and an index as an offset of the base address specified by the pointer. In this embodiment, the POINTER variable is used to specify the base address and the INDEX variable specifies an offset to that base address. Now referring to Table 1 set forth below, a particular branch is set forth for each value of INDEX. For example, if INDEX=3, the program branches to step 206 as set forth in Table 1 below.

TABLE 1

| INDEX | BRANCH |
|---|---|
| 0 | Go To Step 208 |
| 3 | Go To Step 206 |
| 6 | Go To Step 206 |
| 9 | Go To Step 208 |
| 12 | Go To Step 210 |

In order to cause the program to jump in accordance with the locations specified by Table 1, at step 270, the contents of the RESULT variable are transferred to an INDEX variable, which is used as an index to Table 1. At step 272, the address of the location of Table 1 in the computer program is moved to the POINTER variable, which as a result, points to the location of Table 1 in the computer program. At step 274, the contents of the INDEX variable are added to the contents of the POINTER variable, which in this case contain the base address of Table 1, and then the program branches to the appropriate step specified in Table 1. The three possible branch locations specified by Table 1 are the examine new distance from target step 208, the no data detected step 210, and the fine positioning step 206.

Figure 13:
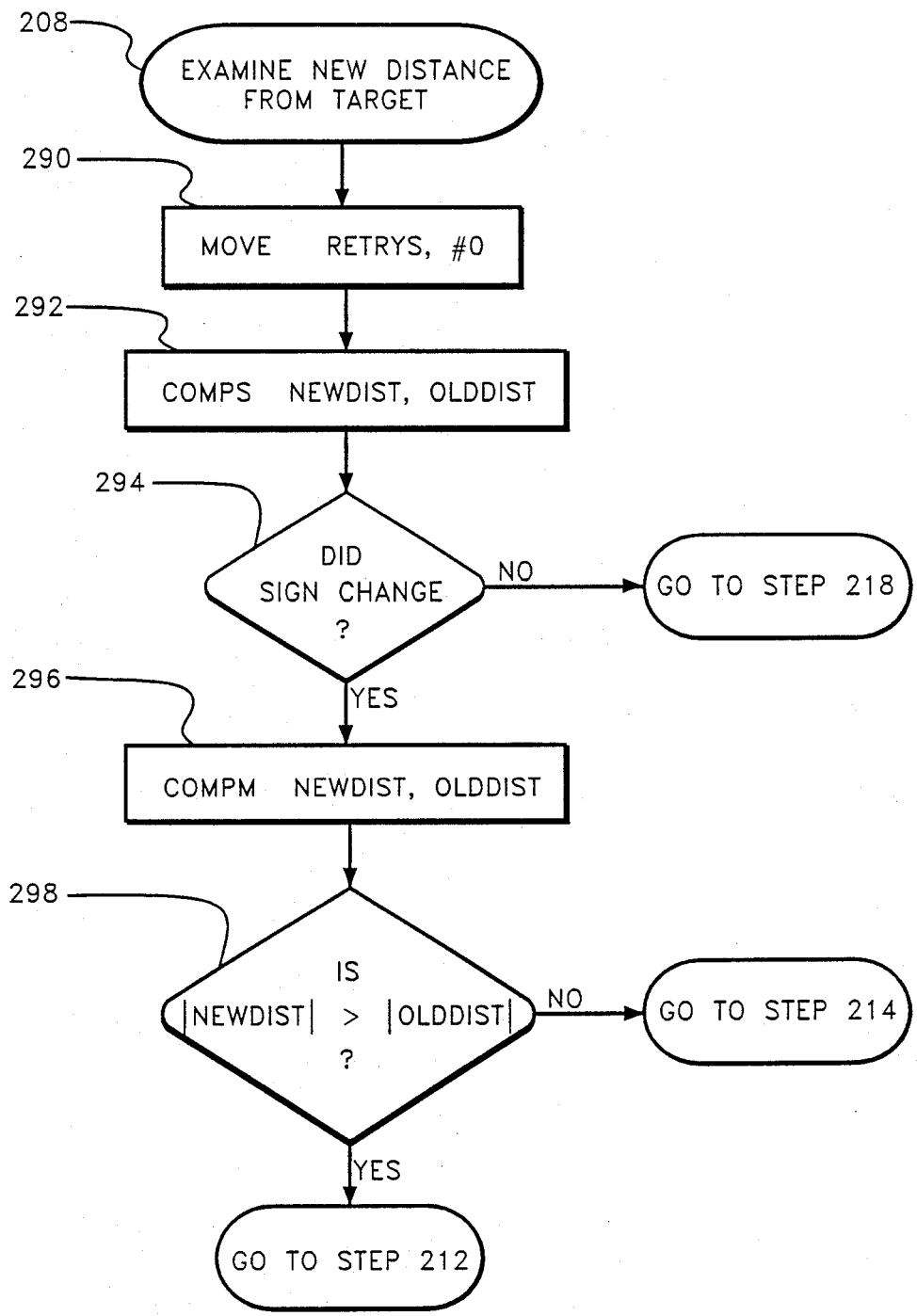
FIG. 13 is a flow chart of the examine new distance from target step shown generally in FIG. 9.

A detailed flow chart of the examine new distance from target step 208, which is shown generally in FIG. 9, is shown in FIG. 13. During the examine new distance from target step 208, the program compares the sign and the magnitudes of the NEWDIST and OLDDIST variables to determine how the magnetic head 46 and tape should be next positioned. Now referring to FIG. 13, at step 290 the variable RETRYS is set to zero. As explained below in the description of the no data detected step 210, this RETRYS variable keeps track of how many times a particular portion of the tape has been read by the magnetic head 46. If no data is detected after three reads of a particular portion of tape, it is assumed that no data is recorded on that portion of the tape.

At step 292, the sign of the variable NEWDIST is compared with the sign of the variable OLDDIST. As explained above, the variable NEWDIST contains the current distance to the target as the numeric difference between the block number of the target data block and the block number to which the magnetic head 46 is currently positioned. The OLDDIST variable contains the previous distance to the target data block as the numeric difference between the block number of the target data block and the block number to which the magnetic head 46 was previously positioned. Thus, if the sign of NEWDIST is not the same as the sign of OLDDIST, then the magnetic head 46 has passed over the target data block in moving from one data track to another data track. At step 294, if the sign did not change, then the program branches to the branch based upon distance from target step 218.

If the signs are different, indicating that the magnetic head 46 skipped over the target data block during its latest track change, then at step 294 the program branches to step 296 in order to compare the absolute value, or magnitude, of OLDDIST and NEWDIST. If the absolute value of NEWDIST is less than the absolute value of OLDDIST, then the position of the head on the current track is closer to the target data block than was the position of the head on the previous data track. In this case, even though the head has moved past the target data block, it is still closer to the target data block than it was previously. Accordingly, at step 298 if the absolute value of NEWDIST is less than the absolute value of OLDDIST, then the program branches to the branch to final positioning step 214. As a result, as is apparent from the overall flow chart in FIG. 9, the initial nonsequential track-to-track positioning of the magnetic head 46 is completed, and the program will no longer execute the change track step 220.

If the absolute value of NEWDIST is greater than the absolute value of OLDDIST, then the head 46 is positioned farther away from the target data track than it was previously, and consequently, the program branches to the positioned too far step 212 during which the head 46 is moved to its previous position.

Figure 14:
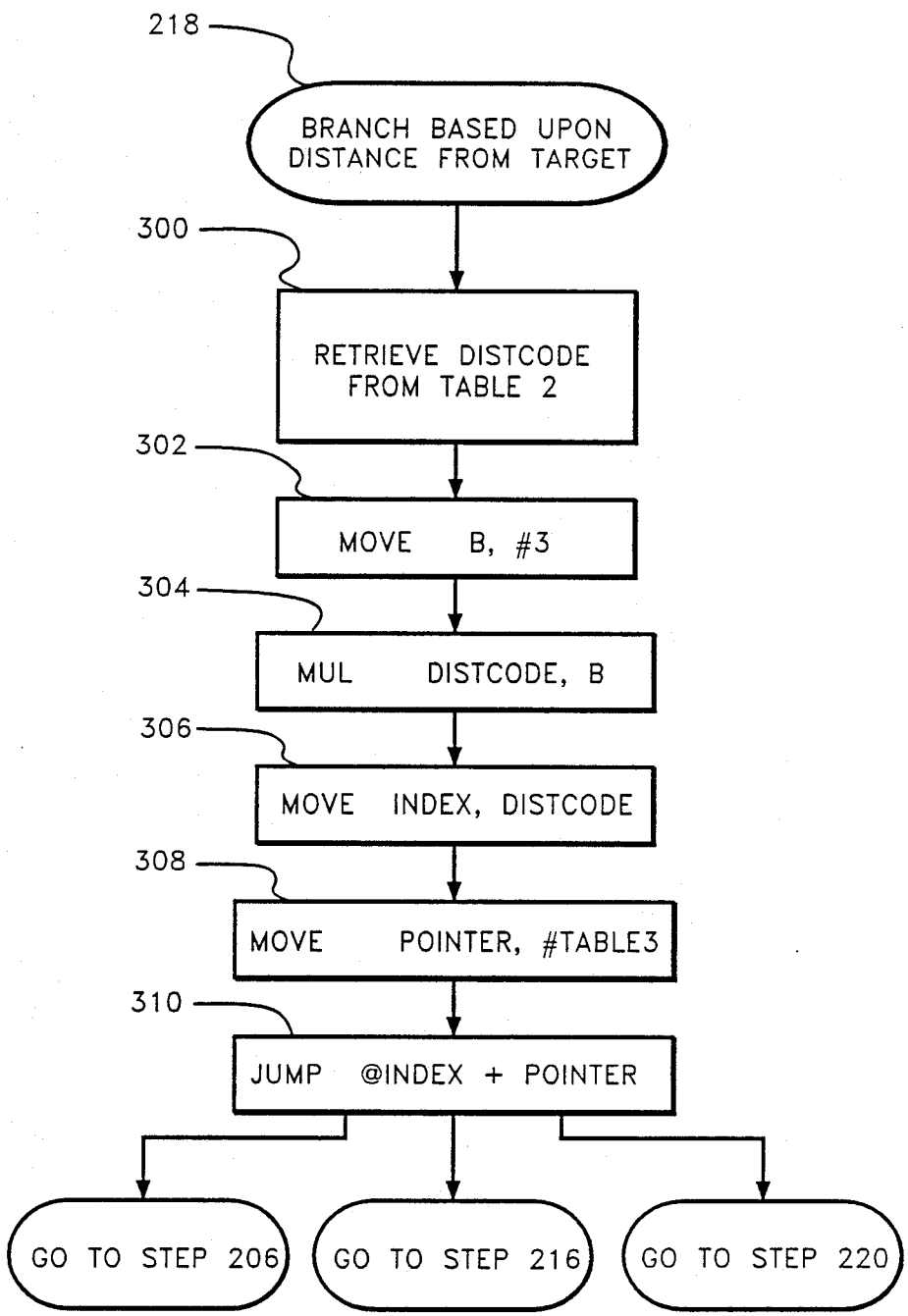
FIG. 14 is a flow chart of the branch based upon distance from target step shown generally in FIG. 9.

A detailed flow chart of the branch based upon distance from target step 218, which is shown generally in FIG. 9, is shown in FIG. 14. This step 218, which is executed during the initial track-to-track portion of the search, basically determines whether the magnetic head 46 should be moved to a different data track, which is determined by comparing the current distance of the magnetic head 46 from the target data block to predetermined values.

Now referring to FIG. 14, at step 300 the program retrieves a DISTCODE variable in accordance with Table 2 set forth below. The DISTCODE variable is representative of the distance of the magnetic head 46 to the target data block as represented by the NEWDIST variable.

TABLE 2

| NEWDIST | | | DISTCODE |
|---|---|---|---|
| | 0 | | 0 |
| 0 | < NEWDIST < | 256 | 1 |
| 256 | ≦ NEWDIST < | 4096 | 2 |
| 4096 | ≦ NEWDIST | | 3 |
| | −1 | | 4 |
| −1 | > NEWDIST > | −256 | 5 |
| −256 | ≧ NEWDIST > | −4096 | 6 |
| −4096 | ≧ NEWDIST | | 7 |

Now referring to Table 2 above, the value of DISTCODE depends upon the value of NEWDIST. The program retrieves the value of DISTCODE corresponding to the value of NEWDIST as set forth above. The DISTCODE variable is used in determining which step the program will branch to based upon the distance represented by the DISTCODE variable.

The DISTCODE variable is multiplied by three and then used as an index to perform an indexed jump similar to the one described above. The DISTCODE variable is multiplied by three because the distance between each entry in the software table, the contents of which are set forth in Table 3 below, is three bytes. Accordingly, at step 302, the number 3 is moved to the variable B, and then at step 304 DISTCODE is multiplied by B. At step 306, the resulting product is moved to the INDEX variable, which is used as an index to perform an indexed jump in accordance with Table 3 set forth below.

TABLE 3

| INDEX | BRANCH |
| --- | --- |
| 0 | Go To Step 206 |
| 3 | Go To Step 206 |
| 6 | Go To Step 206 |
| 9 | Go To Step 220 |
| 12 | Go To Step 206 |
| 15 | Go To Step 216 |
| 18 | Go To Step 216 |
| 21 | Go To Step 220 |

In order to cause the program to jump in accordance with the locations specified by Table 3, at step 306, the contents of the DISTCODE variable are transferred to the INDEX variable, which is used as an index to Table 3. At step 308, the address of the location of Table 3 in the computer program is moved to the POINTER variable, which as a result, points to the location of Table 3 in the computer program. At step 310, the contents of the INDEX variable are added to the contents of the POINTER variable, which in this case contain the address of Table 3, and then the program branches to the appropriate step specified in Table 3. The three possible branch locations specified by Table 3 are the fine positioning step 206, the reverse position step 216, and the change track step 220.

As is apparent from Tables 2 and 3 above, the program branches to the fine positioning step 206 if the new distance represented by the NEWDIST variable was a positive number less than 4096 or was equal to −1. The number 4096 has special significance in that this number is approximately equal to one-third the number of data blocks on one serpentine track of a commonly used magnetic tape cartridge.

As is indicated from Tables 2 and 3 above, if the new distance represented by the NEWDIST variable is between −1 and −4096, then the program branches to the reverse position step 216. In this case, the program leaves the nonsequential search mode in which it is moving the head 46 from track to track, and branches to the reverse position step during which the tape will be rewound by an amount corresponding to the new distance. The limit −4096 also has significance in that its absolute value is approximately equal to one-third the common length of a data track.

Finally, again referring to Tables 2 and 3 , if the absolute value of the new distance is greater or equal to 4096, then the program stays in the nonsequential search mode in which it moves the head 46 from track to track. Accordingly, in this case the program branches to the change track step 220 during which it will move the head 46 one data track closer to the target data block.

Figure 15:
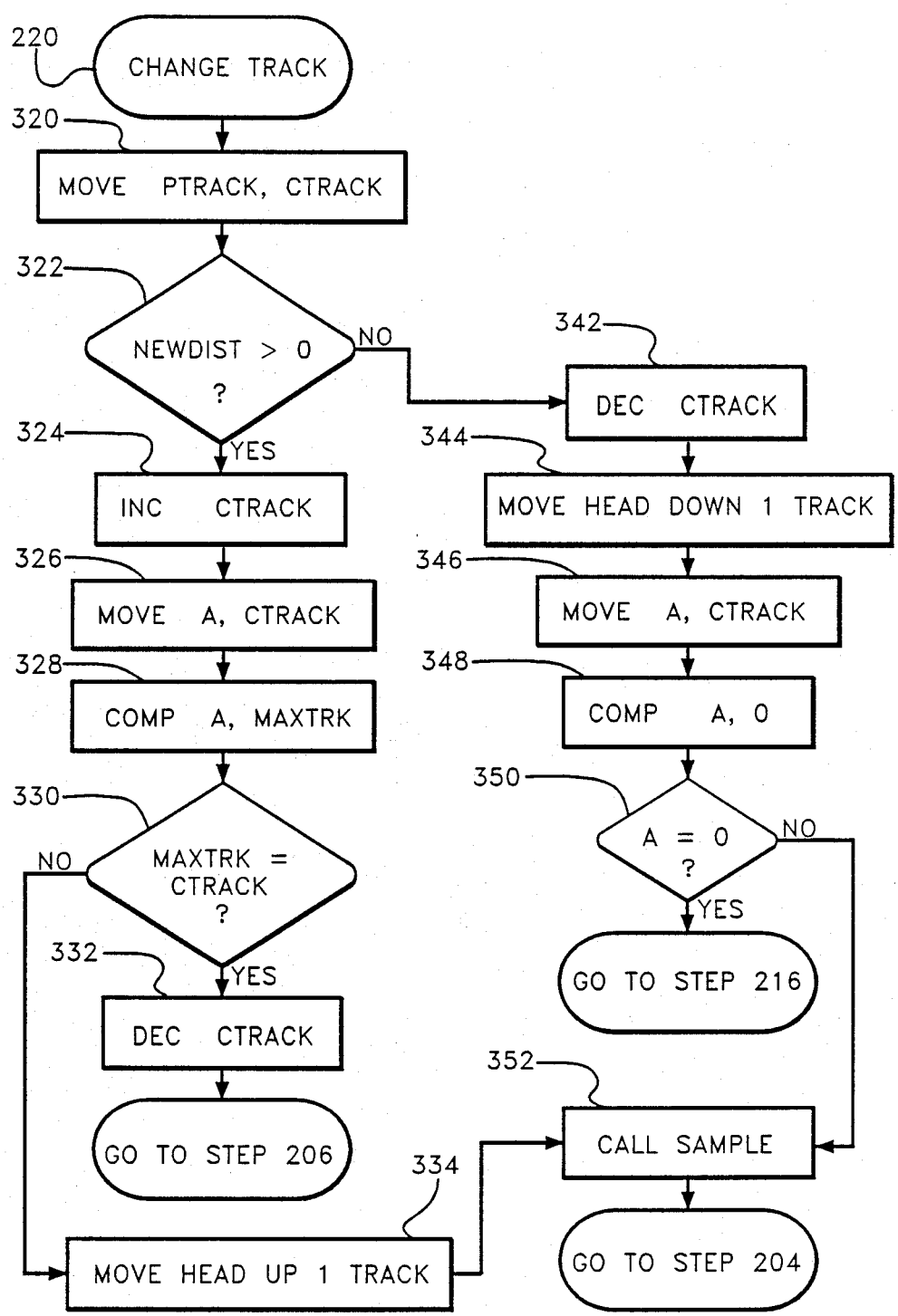
FIG. 15 is a flow chart of the change track step shown generally in FIG. 9.

A detailed flow chart of the change track step 220, which is shown generally in FIG. 9, is shown in FIG. 15. Each time the change track step 220 is performed, it moves the magnetic head 46 up or down one data track. During the initial nonsequential portion of the search, the change track step 220 is performed a number of times attempting to move the magnetic head 46 to within a predetermined number of data blocks of the target data block, the predetermined number being 4096 as described above. Now referring to FIG. 15, at step 320 the current track number to which the magnetic head 46 is positioned, which is stored in the CTRACK variable, is moved to the PTRACK variable, which as described above, represents the data track number to which the head was previously positioned.

Step 322, which is a basic decision step of the change track portion of the program, determines the direction that the magnetic head 46 should be moved, to a numerically higher data track or a numerically lower data track. At step 322, if the new distance is positive, which indicates that the head is positioned to a data block having a block number that is numerically less than the block number of the target data block, the program branches to step 324.

Steps 324–330 are used to determine whether moving the head 46 up one track would position the head to the highest data track on the tape. If it would, then the head is not moved. At step 324, the value of the CTRACK variable, which keeps track of the current track number to which the head 46 is positioned, is incremented so that it is one track greater than the actual track to which the head is currently positioned. At step 326, the contents of the CTRACK variable are moved to the A variable. Then at step 328, the MAXTRK variable, which contains the value of the maximum data track number of the magnetic tape is compared to the contents of the CTRACK variable. For example, if the magnetic tape in the tape drive has nine data tracks, including tracks 0 through 8, then MAXTRK would have a numeric value of eight. At step 330, if the CTRACK variable equals the MAXTRK variable, then the magnetic head 46 will not be moved up one step during this change track step 220, and consequently, the program branches to step 332 at which point the CTRACK variable is decremented, since its value at this point is actually one greater than the actual track number and since the head is not moved up one track. At this point, since the head is not moved to the maximum track number and will not be moved any further, the program exits the track-to-track positioning portion of the search and branches to the fine positioning step 206.

If the maximum track was not equal to the CTRACK variable at step 330, the program branches to step 334 at which point the head 46 is moved up one data track. The phrase "moved up" means that the head 46 is moved to the next numerically higher data track, and does not necessarily imply that the head 46 physically moves in the upward direction. Then the program branches to step 352 in order to read the block number of the data block to which the head 46 is now positioned.

The portion of the change track step just described is executed when the new distance between the head 46 and the target data block as represented by the NEWDIST variable is positive, meaning that the head is positioned to a data block that is numerically lower than the target data block, which is determined at step 322 described above. If the new distance is negative as determined at step 322, meaning that the head is positioned to a data block having a block number that is numerically higher than that of the target data block, then the program branches from step 322 to step 342. At step 342, the value of the CTRACK variable is decremented by one since the head 46 is going to be moved down to the next numerically lower data track. At step 344, the head 46 is moved down one data track.

Steps 346–350 are used to "look ahead" to the future execution of the program to determine whether the head 46 could be moved down another data track during a subsequent execution of the change track step 220. If the head 46 would not be moved down during a subsequent change track step, then the program exits the track-to-track portion of the search and branches to the reverse position step 216. At step 346, the A variable, receives the value of CTRACK. At step 348, the value of CTRACK stored in A is compared to zero. If A equals zero, then the program exits the track-to-track portion of the search by branching to the reverse position step 216 since the head 46 would not be moved down during a subsequent execution of the change track step 220.

If A is not equal to zero at step 350, then the program branches to step 352 at which point the program retrieves the block number of the data block on the new track to which the head 46 has been positioned, and then the program branches to the indexed branch step 204 to continue the track-to-track portion of the search.

While the magnetic head 46 is moved a single data track at a time during the track-to-track portion of the search as described above, the magnetic 46 head could be moved more than one track at a time and the benefits of the invention would be retained.

Figure 16:
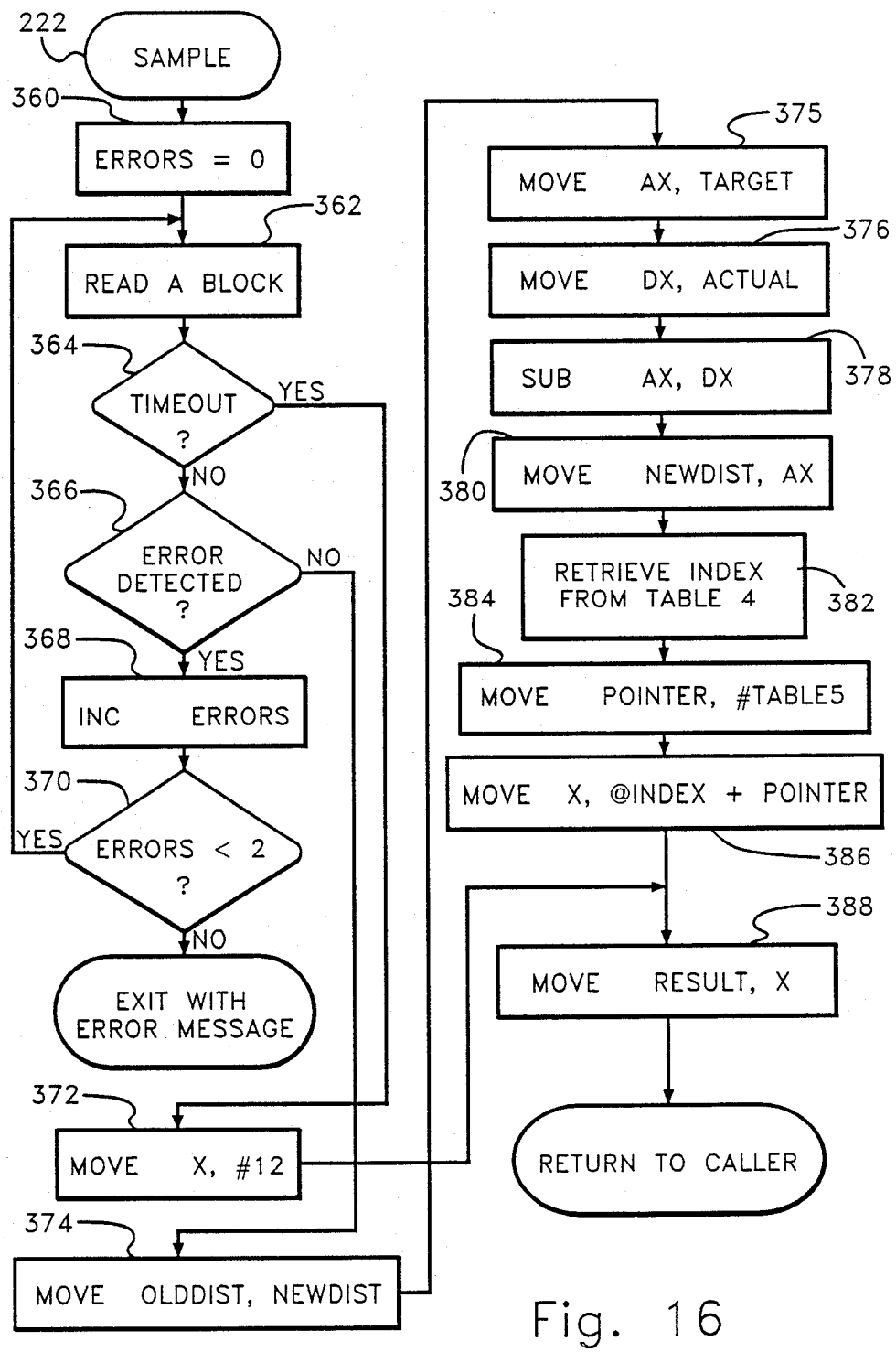
FIG. 16 is a flow chart of the sample block address step shown generally in FIG. 9.

A detailed flow chart of the sample block address subroutine 222, which is shown generally in FIG. 9, is shown in FIG. 16. The purpose of this sample subroutine 222 is simply to read the data block to which the magnetic head 46 happens to be positioned. After the data block is read, the new distance to the target data block is calculated based upon the block number of the data block just read, and the RESULT variable is updated based upon the new distance for use in the indexed branch step 204.

Now referring to FIG. 16, at step 360, the ERRORS variable is reset to 0 at the beginning of the sample subroutine 222. The ERRORS variable is used to keep track of how many read errors are made during the course of the sample step. At step 362, the magnetic head 46 reads a data block. This is accomplished by accelerating the DC motor that drives the tape until the tape reaches the speed at which it is read. The head 46 then reads a data block and the motor is decelerated until it stops.

If the magnetic head 46 cannot read a data block at step 362, meaning that there does not appear to be any data recorded on the portion of the tape currently being read, then the program times out at step 364 in which case it branches to step 372. The time out waiting period of step 364 is equivalent to the time required for 34 data blocks to cross the magnetic head 46. Thus, if the head 46 does not detect a data block within a length of tape corresponding to that required for 34 data blocks, the program times out. At step 372, the X variable is set equal to the number 12, which as explained below, indicates that no data was detected at the current position of the head 46.

If the magnetic head 46 reads a data block at step 362, then the program will not time out at step 364, and the program will branch to step 366 to determine whether an error, for example a well-known cyclic redundancy check (CRC) error, was detected. If an error was detected, then at step 368 the ERRORS variable is incremented. At step 370, the ERRORS variable is tested to determine if it is less than two. If it is less than two, then the program branches back to step 362 in order to read another data block. If the value of ERRORS is not less than two, then the program returns with an error message.

If no error was detected at step 366, then a valid data block was read, and the program branches to step 374. Steps 374-380 calculate the new distance of the magnetic head 46 from the target data block. At step 374, the value of NEWDIST is transferred to OLDDIST. At step 375, the contents of the TARGET variable, which contains the block number of the target data block, are moved to the software register AX. At step 376, the contents of the ACTUAL variable, which contains the block number of the data block just read at step 362, are moved to the software register DX. At step 380, the contents of DX are subtracted from the contents of AX, and at step 382 the resulting new distance stored in AX is moved to the NEWDIST variable.

Steps 382-388 load the RESULT variable with a particular number that is based upon the new distance to the target. As is explained above, the value of the RESULT variable determines which step the program branches to during the indexed branch step 204. At step 382, a particular value of the INDEX variable is retrieved depending upon the value of the NEWDIST variable in accordance with Table 4 set forth below.

TABLE 4

| NEWDIST | INDEX |
|---|---|
| 0 | 0 |
| 0 < NEWDIST < 256 | 1 |
| 256 ≦ NEWDIST < 4096 | 2 |
| 4096 ≦ NEWDIST | 3 |
| −1 | 4 |
| −1 > NEWDIST > −256 | 5 |
| −256 ≧ NEWDIST > −4096 | 6 |
| −4096 ≧ NEWDIST | 7 |

After the INDEX variable is retrieved in accordance with Table 4 set forth above, the program uses an indexed branch to retrieve a numeric value to store in the RESULT variable. To this end, at step 384, the address in the computer program of the table set forth below as Table 5 is moved to the POINTER variable. Then at step 386, the program stores in the X variable a particular numeric value, depending upon the value of the INDEX variable, which is used as an index to Table 5.

TABLE 5

| INDEX | X |
|---|---|
| 0 | 3 |
| 1 | 0 |
| 2 | 0 |
| 3 | 0 |
| 4 | 6 |
| 5 | 9 |
| 6 | 9 |
| 7 | 9 |

In order to retrieve the appropriate value specified by Table 5, at step 386, the contents of the INDEX variable are added to the contents of the POINTER variable, which in this case contain the address of Table 5, and then the program stores in the X variable the value specified by the INDEX variable. Then at step 388, the contents of the X variable are transferred to the RESULT variable for use by the indexed branch step 204, and then the program returns to the portion of the program that invoked the sample subroutine 222.

As set forth below, conventional streaming tape drives sense the physical end and beginning of the magnetic tape by photoelectrically sensing the presence of holes in the tape at various locations. When a tape drive senses the end or beginning of tape, the tape drive reverses the direction of the tape and begins reading the next numerically higher data track automatically. However, during the execution of the sample subroutine 222, the magnetic head 46 is not automatically moved to the next numerically higher data track if the beginning or end of the tape is sensed. Instead, the tape is rewound so that the head 46 can read a data block recorded on the current data track. As a result, the execution of the program is more robust since the CTRACK and PTRACK variables are not invalidated due to an automatic track switch.

Figure 17:
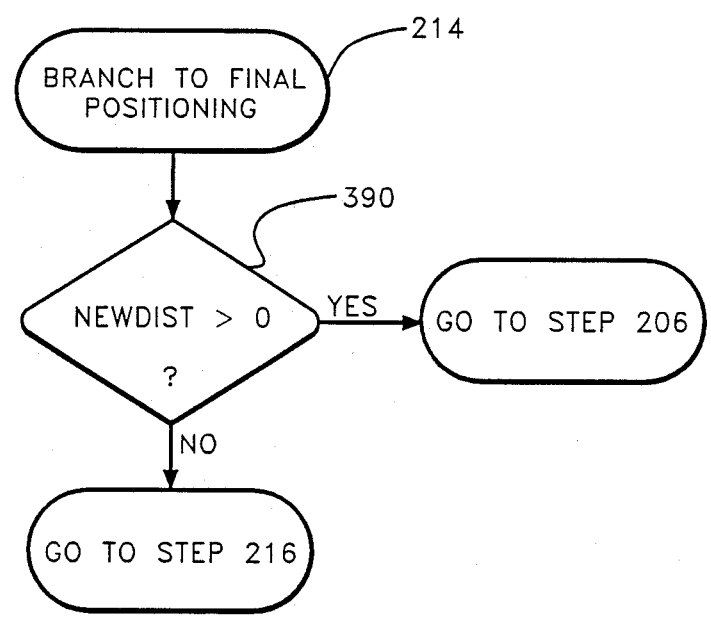
FIG. 17 a flow chart of the branch to final positioning step shown generally in FIG. 9.

A detailed flow chart of the branch to final positioning step 214, which is shown generally in FIG. 9, is shown in FIG. 17. This portion of the program is executed after the completion of the initial, nonsequential track-to-track portion of the search. The purpose of the branch to final positioning step 214 is simply to determine whether the tape should be rewound a particular distance, based upon whether the head 46 is positioned to a data block having a higher block number or a lower block number than the block number of the target data block. This is accomplished at step 390, at which the NEWDIST variable is tested to determine whether it is greater than zero. If NEWDIST is greater than zero, which means that the tape does not have to be rewound a particular distance, then the program branches to the fine positioning step 206. Otherwise, the program branches to the reverse position step 216 so that the tape can be rewound.

Figure 18:
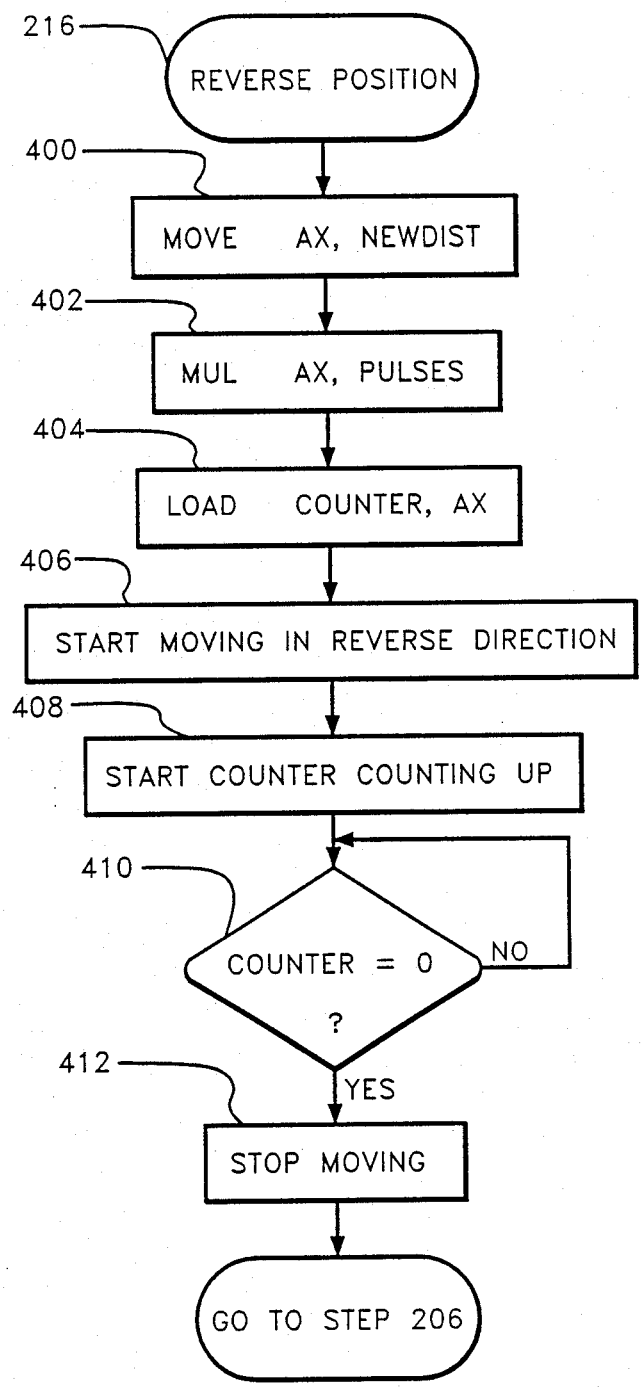
FIG. 18 is a flow chart of the reverse position step shown generally in FIG. 9.

A detailed flow chart of the reverse position step 216, which is shown generally in FIG. 9, is shown in FIG. 18. The reverse position step 216 is executed after the initial track-to-track portion of the search when the magnetic head 46 is positioned to data block having a block number greater than the block number of the target data block. In this case, the tape needs to be rewound a particular distance in order to position the magnetic head 46 to a data block having a block number smaller than the block number of the target data block so that the head can read the target data block in the forward direction.

Now referring to FIG. 18, at step 400, the contents of the NEWDIST variable are transferred to the AX register. Since the only way to branch to this reverse position step 216 is upon the new distance to the target being negative, NEWDIST will have a negative value. At step 402, the PULSES variable, which stores the number of tachometer pulses generated by the DC motor for each data block, is multiplied by the AX register. As set forth above, the tachometer generates four pulses for each data block that crosses the magnetic head 46 for a tape recorded at a recording density of 10,000 flux transitions per inch. In this case, PULSES would equal four. The number stored in the AX register at the end of step 402, which is negative, has a magnitude that is equal to the number of tachometer pulses that would be generated if the magnetic head 46 were moved from its present data block to the target data block. At step 404, a counter is loaded with the negative number of tachometer pulses stored in the AX register. At step 406, the tape is started moving in the reverse direction, and at step 408 the counter begins counting up from the negative number of pulses initially stored in it to zero.

After the counter is started at step 408, the capstan motor 40 that causes the tape to be rewound is driven until the counter counts up to zero at step 410. When the counter reaches zero, at step 412 the capstan motor 40 is turned off and the tape stops moving. As a result of this reverse positioning step, the target data block is usually repositioned with respect to the magnetic head 46 so that the head will be able to read the target block in the forward direction.

In some cases, however, the head 46 may still be positioned to a data block having a block number that is greater than the block number of the target data block. During the initial recording of the tape, if a recording error is detected, the data block being recorded is rerecorded without reversing the tape. As a result, 100 valid data blocks with block numbers 1000-1099 may be recorded on a length of tape on which 120 data blocks could be stored without error. Thus, if in this case the tape were rewound a distance corresponding to the length of 100 data blocks from block 1099, the head would still be positioned to a data block having a block number greater than 1000. Thus, the reverse position step 216 does not always cause the head to be positioned below the target data block. As described below, this is remedied in the fine positioning step 206 by providing for a provisional tape rewind. After the completion of the reverse position step 216, the program branches to the fine positioning step 206.

Figure 19:
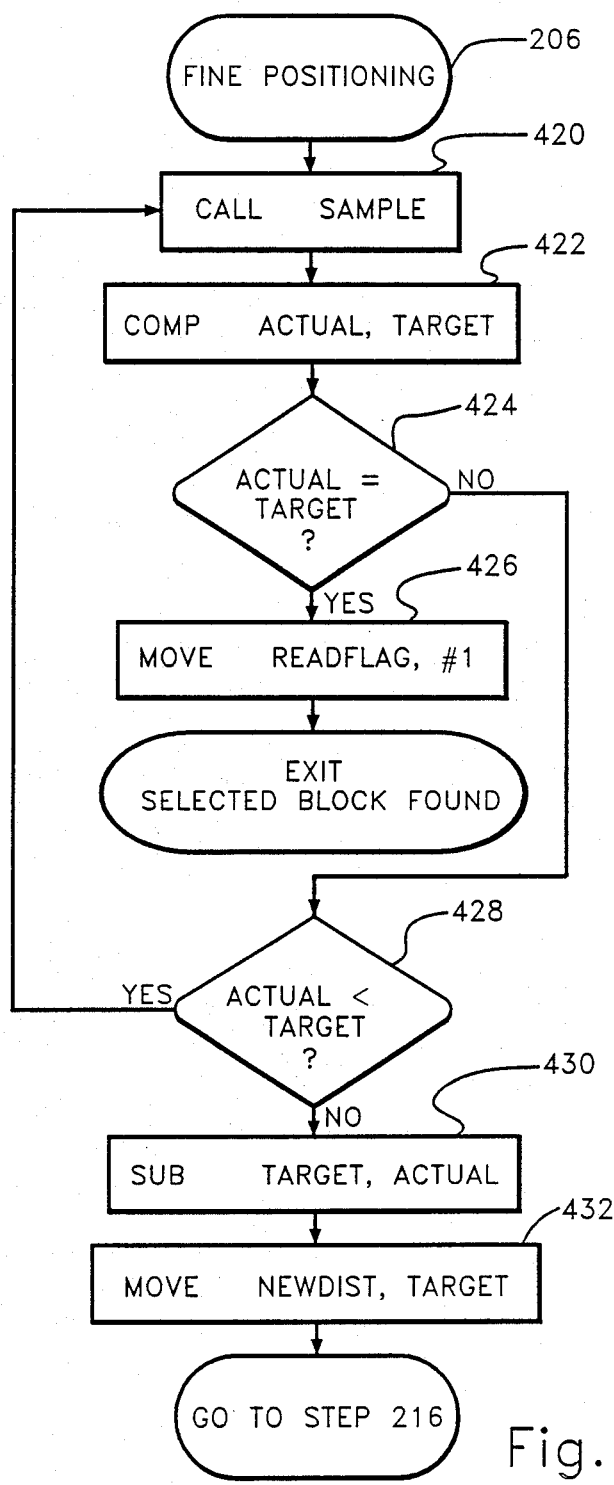
FIG. 19 is a flow chart of the fine positioning step shown generally in FIG. 9.

A detailed flow chart of the fine positioning step 206, which is shown generally in FIG. 9, is shown in FIG. 19. The fine positioning step 206 is executed after the initial track-to-track portion of the search when the magnetic head 46 is positioned to data block having a block number that is usually less than the block number of the target data block. Thus, in most cases the magnetic head 46 will be able to read the target data block without having the tape rewound.

At the start of the fine positioning step 206, the magnetic head 46 will be positioned to a data block within a predetermined distance of the target data block or will be positioned so that the distance to the target block is minimized. The target data block may not necessarily be on the data track to which the head is positioned, but by reading the block numbers sequentially in the forward direction, the magnetic head 46 will read the target data block.

Conventional streaming tape drives sense the physical end and beginning of the magnetic tape by photoelectrically sensing the presence of holes in the tape at various locations. When a tape drive senses the beginning or end of tape, the tape drive reverses the direction of the tape and begins reading the next numerically higher data track automatically. Thus, even if the target data block is not on the data track to which the head is positioned when the fine positioning step 206 is invoked, the tape drive will read the target data block as a matter of course.

Now referring to FIG. 19, at step 420 the program calls the sample subroutine 222 in order to retrieve the block number of the data block to which the magnetic head 46 is currently positioned. Then at step 422, the block number of the target block is compared to the block number of the data block to which the head 46 is currently positioned. At step 424, if the actual block number is equal to the target block number, then the magnetic head 46 has located the target data block, and after moving the number one to the READFLAG variable at step 426 to indicate that the current tape inserted in the tape drive has been read, the program is finished.

If the actual block number is not equal to the target block number, then the program branches to step 428 where the actual block number is tested to determine if it is smaller than the target block number. In most cases the actual block number will be smaller, and the program will branch to step 420 so that another block number will be retrieved. Steps 420-424 and 428 will repeat until the target block has been located. During the repetition of steps 420-428, the sample step 222 causes the tape to be continuously moved across the magnetic head instead of being accelerated to read a single data block and then decelerated.

If the actual block number is not less than the target block number as determined at step 428, then the program will branch to step 430 at which point the actual block number is subtracted from the target block number in order to calculate the new distance from the target data block. At step 432, this new distance is stored in the NEWDIST variable, and then the program branches to the reverse position step 216 so that the tape can be rewound by an amount proportional to the new distance just calculated.

Figure 20:
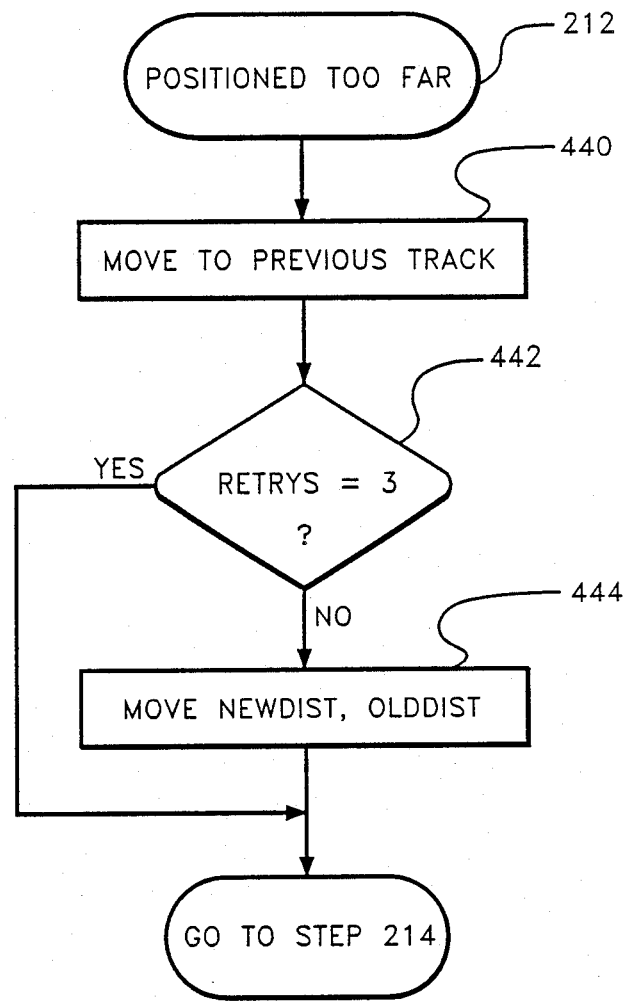
FIG. 20 is a flow chart of the positioned too far step shown generally in FIG. 9.

A detailed flow chart of the positioned too far step 212, which is shown generally in FIG. 9, is shown in FIG. 20. The positioned too far step is performed when, during the track-to-track portion of the search for the target data block, the magnetic head 46 is moved too far past the target data block, which is the case where the sign of the distance from the target changes and the new distance to the target is greater than the previous distance to the target. In this case, the positioned too far step simply causes the magnetic head 46 to be positioned to the track to which it was previously positioned.

Now referring to FIG. 20, at step 440, the magnetic head 46 is moved back to the track to which it was previously positioned. At step 442, the variable RETRYS is examined in order to determine whether or not a new, valid value of NEWDIST has been computed. If RETRYS equals three, then the value of NEWDIST applies to the previous position and, therefore, OLDDIST should not be copied to NEWDIST. If RETRYS does not equal three, then OLDDIST represents the previous position and is copied to NEWDIST at step 444. Then the program leaves the track-to-track portion of the search for the target data block and branches to the branch to final positioning step 214.

Figure 21:
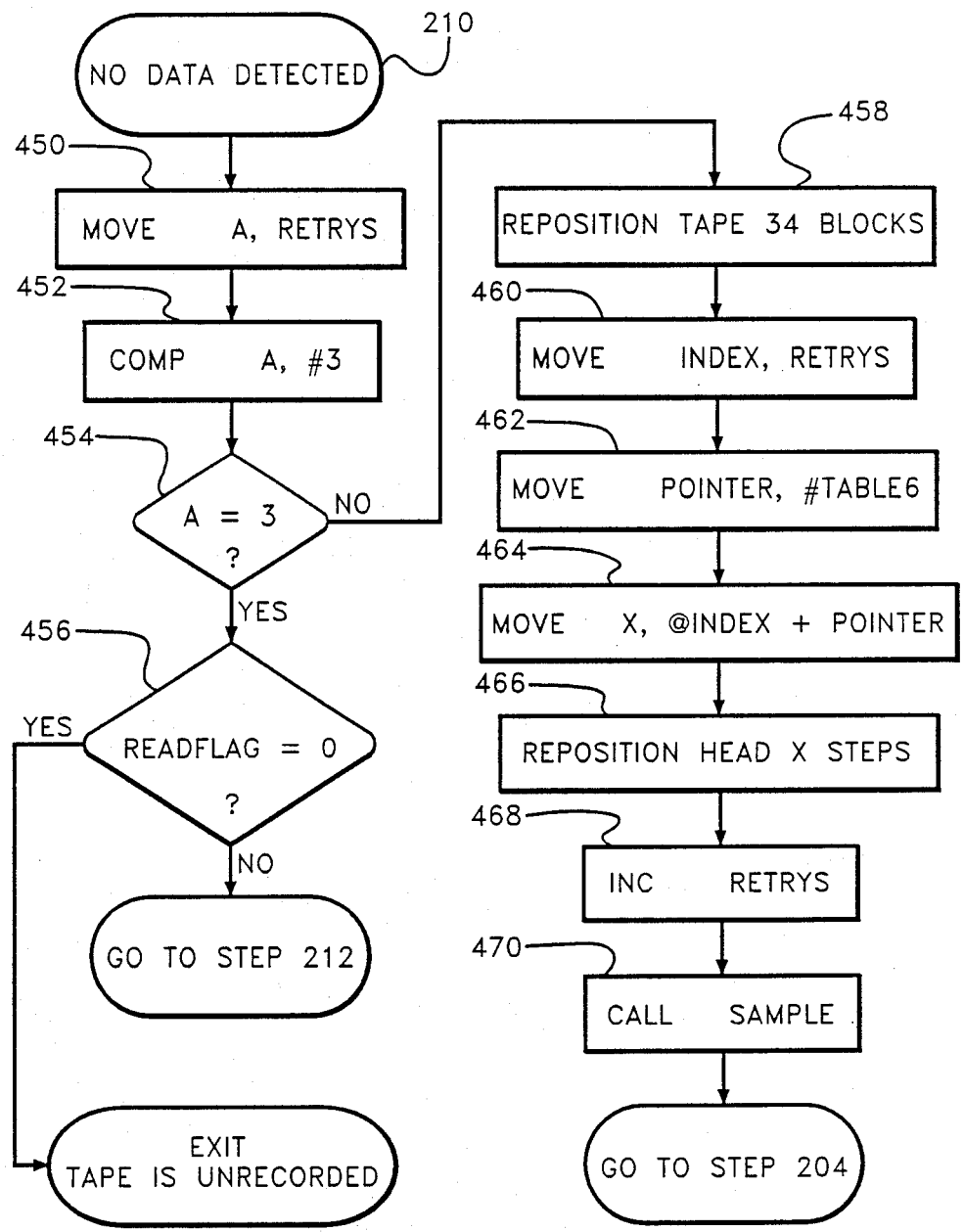
FIG. 21 is a flow chart of the no data detected step shown generally in FIG. 9.

A detailed flow chart of the no data detected step 210, which is shown generally in FIG. 9, is shown in FIG. 21. The program branches to the no data detected step 210 from the indexed branch step 204 when no data has been detected during the sample subroutine 222. The purpose of the no data detected step 210 is to cause the stepping motor to slightly reposition the magnetic head 46 away from the center of the data track in order to recover data that might have been recorded offset from the center of the data track. The magnetic head 46 makes three additional attempts to recover data at positions slightly offset from the center of the data track.

Now referring to FIG. 21, at step 450, the contents of the RETRYS variable are transferred to the A variable. The RETRYS variable keeps track of how many additional attempts, or retries, the magnetic head 46 has made to recover data at positions slightly offset from the center of the data track to which the head is positioned. The program will perform three retries before concluding that there is no data recorded on a particular portion of the tape. At step 452, the number of retries stored in the A variable is tested to determine if it is equal to three. At step 454, if the number of retries is equal to three, then it is assumed that there is no data recorded on the section of the magnetic tape to which the head 46 is positioned, and the program branches to step 456 to determine whether the tape inserted in the drive happens to be an unrecorded tape. In order to determine whether the tape is unrecorded, at step 456, the READFLAG variable is tested to determine if it is zero. As explained above, when the READFLAG variable is zero, then the tape currently in the drive has not been read by the tape drive, and in this case, the tape was rewound to the beginning of the recorded data on track 0 at step 200. Thus, if the READFLAG variable is zero at step 456, then the tape was rewound at step 200. Since the magnetic head 46 still has not detected data after three retries and the head is at the beginning of track 0, then there is no data recorded on the tape, and the program ends. At step 454, if the number of retries is not equal to three, in which case it is less than three, then the program branches to step 458. Steps 458-470 cause the magnetic head 46 to make another read attempt at various positions slightly offset from the center of the data track. At step 458, the tape is rewound by a length equivalent to 34 data blocks in order to reposition the tape to the point at which the magnetic head 46 detected no data. At step 460, the RETRYS variable is set to value of the INDEX variable. The INDEX variable is used as an index to a table in the computer program which has three values that control how far from the center of the track the magnetic head 46 is positioned before attempting another retry. At step 462, the POINTER variable is set equal to the address of the table in the computer program. The table is set forth below as Table 6.

TABLE 6

| INDEX | X |
|---|---|
| 0 | 3 |
| 1 | −3 |
| 2 | 0 |

Each of the entries set forth in Table 6 below the X variable is a number of steps through which the stepping motor that controls the position of the magnetic head 46 will be displaced from the center of the current data track. Each step through which the motor is driven causes the magnetic head 46 to move one-thousandth of an inch. Thus, the values 3, −3, and 0 under the X variable in Table 6 cause the head to be positioned three-thousandths of an inch above, three-thousandths of an inch below, and even with, respectively, the center of the data track to which the head 46 is currently positioned.

Step 464 retrieves the appropriate X value from Table 6, based upon the value of INDEX as set forth above by adding the value of the INDEX variable to the value of the POINTER variable and retrieving the appropriate value from the table and storing it in the X variable. Then, at step 466, the stepping motor is driven the number of steps specified by the X variable. At step 468, the RETRYS variable is incremented, and then at step 470, the program calls the sample subroutine 222 so that the head 46 can attempt to read the portion of the tape on which it did not previously detect a data block.

After the program returns from the sample subroutine 222, the program branches to indexed branch step 204. If the magnetic head 46 did not detect data at its offset track location, then the program will perform steps 450-470 until the head 46 has made three retrys, at which point the program assumes that no data is present at that particular location on the tape. In this case, the program would leave the no data detected step 210 and branch to the positioned too far step 212 explained above.

An Example of the Operation of the Computer Program

Figure 22:
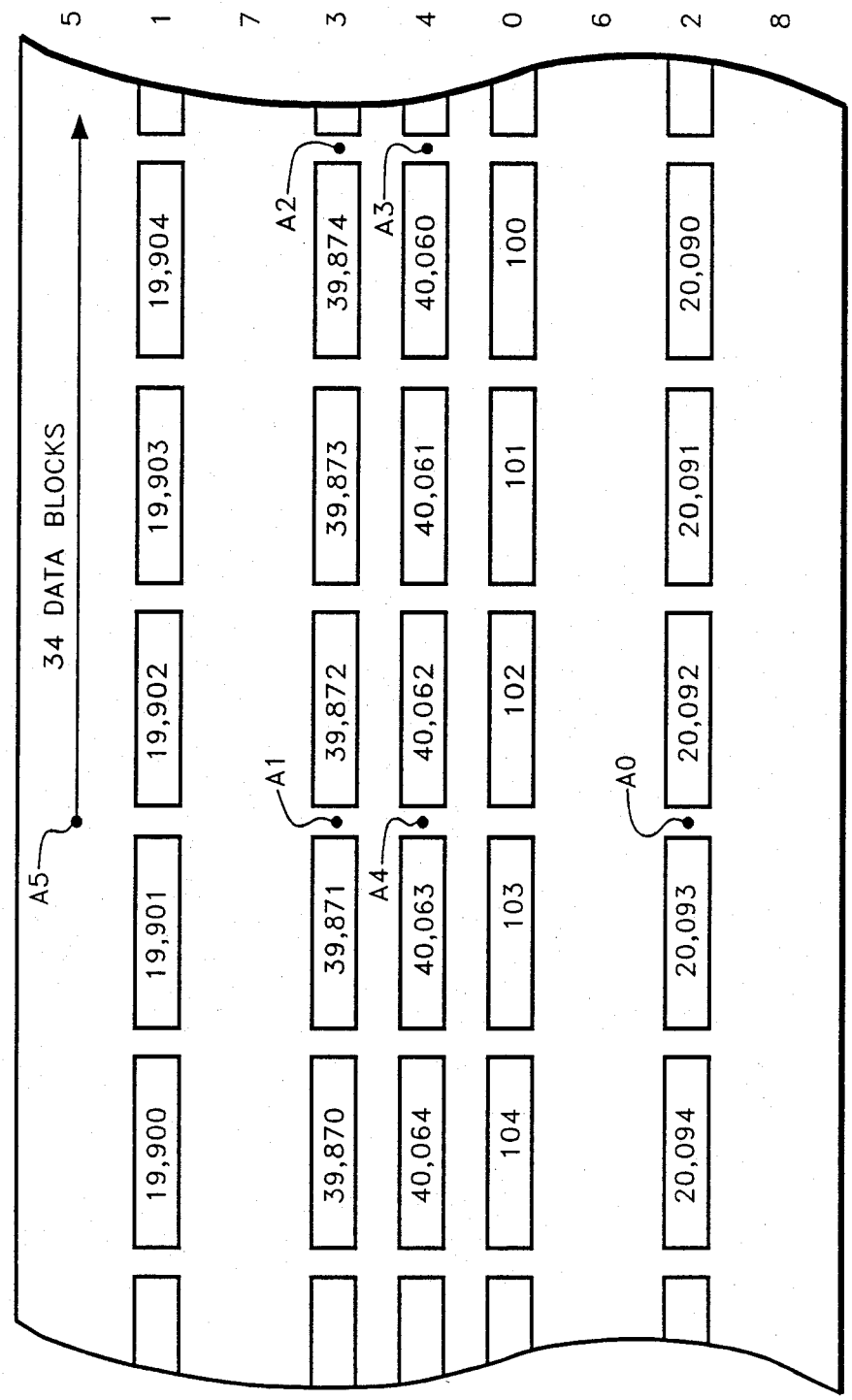
FIG. 22 is a portion of magnetic tape recorded in serpentine fashion showing various positions to which a magnetic head would be positioned with respect to the tape during the performance of a search for a selected data block performed in accordance with the present invention.

The operation of the program described in detail above is further illustrated by an example of a search for a selected data block. A portion of a tape recorded in serpentine manner is illustrated in FIG. 22. The tape shown in FIG. 22 includes data blocks 100-104 on track 0; data blocks 19,900-19,904 on track 1; 20,090-20,094 on track 2; data blocks 39,870-39,874 on track 3; and data blocks 40,060-40,064 on track 4. Tracks 5 through 8 are unrecorded. Each of the data tracks in FIG. 22 has been shown to include approximately 10,000 data blocks per track for purposes of the following example. The actual number of data blocks on any given tape varies with the length of tape and the data recording density.

For purposes of this example, assume that the magnetic head 46 of the tape drive is currently located at position A0 indicated in FIG. 22 after having read data block 20,091, and that the selected block to be located by the tape drive is data block 45,000. The program begins execution at the initial rewind step 200. For purposes of this example, it will be assumed that the tape has been previously read. Accordingly, the program branches from the initial rewind step 240 without rewinding the tape to the initialize parameters step 202.

During the execution of the initialize parameters step 202, the NEWDIST and OLDDIST variables are loaded with the number 24,909, which is the difference between the TARGET value of 45,000 and the ACTUAL value of 20,091, at steps 256 and 258. The RESULT variable is forced to zero and the CTRACK and PTRACK variable are set to two since the head 46 is currently positioned to data track 2. Then the program branches to the indexed branch step 204.

During the indexed branch step 204, the program will branch to the examine new distance from target step 208 since the RESULT variable was initialized to zero at step 260. During the examine distance from target step 208, at step 292 the program will compare the sign of the new distance with that of the old distance. In this case, these numbers are the same, 24,909, and at step 294, since the sign did not change, the program will branch to the branch based upon distance from target step 218.

During the branch based upon distance from target step 218, at step 300, the program will retrieve the value three for DISTCODE since NEWDIST is 24,909. At step 304, the DISTCODE value will be multiplied by three and the resulting number nine will be stored in the INDEX variable at step 306. At step 310, the program will branch to the change track step 220, as set forth in Table 3, based upon the INDEX value of nine.

During the change track step 220, since NEWDIST is positive, at step 322 the program will branch to step 324 at which CTRACK will be incremented to three. At step 328, the CTRACK value of three will be compared with the MAXTRK value, which is eight in this case, and the program will branch to step 334 since MAXTRK was not equal to CTRACK at step 330. At step 334, the magnetic head will be moved up one track, to track 3. Now referring to FIG. 22, the head has been moved to position A1 on track 3 from position A0 on track 2. Then, at step 352, the program calls the sample subroutine 222.

During the sample subroutine 222, the head reads a data block on track 3. To avoid undue complexity for purposes of this example, it is assumed that the DC motor takes one data block length to accelerate and decelerate the tape, with the head reading the data block between the acceleration and deceleration. Thus, at the beginning of the sample subroutine 222 the head is at position A1 on track 3 in FIG. 22. The tape is accelerated across the head one data block length, and the head reads the data block having block number 39,873, and then the tape comes to rest when the head is at position A2 on track 3 with respect to the tape. In actuality, much more time, and thus tape length, is needed to accelerate and decelerate the tape.

Since the head was able to read a data block at step 362, the program does not time out, and thus branches to step 366, and since no error was detected, the program branches to step 374, during which the current NEWDIST of 24,909 is moved to the OLDDIST variable. At steps 375-380, NEWDIST is then calculated from the new ACTUAL value of 39,873 and the TARGET of 45,000 to be 5,127. At step 382, the program retrieves an INDEX value of three from Table 4 and at step 386 retrieves a value zero for X from Table 5, which it moves to the RESULT variable at step 388. The program then returns to step 352 of the change track step 220, and the program branches to the indexed branch step 204.

The second time the indexed branch step 204 is executed, the program will branch to the examine new distance from target step 208 since the RESULT variable was set to zero at step 388. During the examine distance from target step 208, at step 292 the program will compare the sign of the new distance with that of the old distance. At step 294, since the sign of NEWDIST of 5,127 did not change from the sign of the OLDDIST of 24,909, the program will branch to the branch based upon distance from target step 218.

During the branch based upon distance from target step 218, at step 300, the program will retrieve the value three for DISTCODE since NEWDIST is 5,127. At step 304, the DISTCODE value will be multiplied by three and the resulting number nine will be stored in the INDEX variable at step 306. At step 310, the program will branch to the change track step 220, as set forth in Table 3, based upon the INDEX value of nine.

During the change track step 220, since NEWDIST is positive, at step 322 the program will branch to step 324 at which CTRACK will be incremented to four. At step 328, the CTRACK value of four will be compared with the MAXTRK value, which is eight in this case, and the program will branch to step 334 since MAXTRK was not equal to CTRACK at step 330. At step 334, the magnetic head will be moved up one track, to track 4. Now referring to FIG. 22, the head has been moved to position A3 on track 4 from position A2 on track 3. Then, at step 352, the program calls the sample subroutine 222.

During the sample subroutine 222, the head reads the data block 40,061 on track 4 from its starting position A3 and ends up at position A4 on track 4.

Since the head was able to read a data block at step 362, the program does not time out, and thus branches to step 366. Since no error was detected, the program branches to step 374 at which point the current NEWDIST of 5,127 is saved to OLDDIST. At steps 375-380, the NEWDIST is then calculated from the new ACTUAL value of 40,061 and the TARGET of 45,000 to be 4,939. At step 382, the program retrieves an INDEX value of three from Table 4 and at step 386 retrieves a value zero for X, which it moves to the RESULT variable at step 388. The program then returns to step 352 of the change track step 220, and the program branches to the indexed branch step 204.

The third time the indexed branch step 204 is executed, the program will branch to the examine new distance from target step 208 since the RESULT variable was set to zero at step 388. During the examine distance from target step 208, at step 292 the program will compare the sign of the new distance with that of the old distance. At step 294, since the sign of NEWDIST of 4,939 did not change from the sign of the OLDDIST of 5,127, the program will branch to the branch based upon distance from target step 218.

During the branch based upon distance from target step 218, at step 300, the program will retrieve the value three for DISTCODE since NEWDIST is 4,939. At step 304, the DISTCODE value will be multiplied by three and the resulting number nine will be stored in the INDEX variable at step 306. At step 310, the program will branch to the change track step 220, as set forth in Table 3, based upon the INDEX value of nine.

During the change track step 220, since NEWDIST is positive, at step 322 the program will branch to step 324 at which CTRACK will be incremented to five. At step 328, the CTRACK value of five will be compared with the MAXTRK value, which is eight in this case, and the program will branch to step 334 since MAXTRK was not equal to CTRACK at step 330. At step 334, the magnetic head will be moved up one track, to track 5. Now referring to FIG. 22, the head has been moved to position A5 on track 5 from position A4 on track 4. Then, at step 352, the program calls the sample subroutine 222.

During the sample subroutine 222, the head attempts to read a data block on track 5 from its starting position A5 in the direction of the arrow. Since track 5 is unrecorded, the head will not be able to read a data block at step 362, and the program will time out at step 364 and branch to step 372 at which the X variable is loaded with the number 12. The program branches to step 388 at which point the number 12 stored in the X variable is stored in the RESULT variable. The program then returns to step 352 of the change track step 220, and the program branches to the indexed branch step 204.

The fourth time the indexed branch step 204 is executed, the program will branch to the no data detected step 210 since the RESULT variable was set to twelve at step 388. During the no data detected step 210, at step 450, the contents of the RETRYS variable, which represents the number of additional read attempts the head has made where no data is detected, are moved to the A variable. The value of RETRYS is zero since it was set to zero at step 290. Since the number of retries is less than three, at step 454 the program branches to step 458, at which the tape is repositioned 34 blocks so that magnetic head is positioned to the same portion of the tape on which it detected no data earlier, which in this case is position A5 shown in FIG. 22. At steps 46.0–464 the head offset value X is retrieved from Table 6 , and at step 466 the head is moved upwards three steps higher than the center of the data track 5. At step 468, RETRYS is incremented by one, and at step 470 the sample subroutine 222 is called.

When the sample subroutine 222 is called, the head will again detect no data since data track 5 is unrecorded. As a result, when the sample subroutine 222 returns to the no data detected step 470, it will have stored the number 12 in the RESULT variable. As a result, when the program branches to the indexed branch step 204, the program will again branch to the no data detected step 210.

Steps 450–454 and 458–470 will be performed two more times in order to attempt to recover data from track 5 on the tape. However, no data will be detected, and the program will branch to the no data detected step 450 a fourth time when the value of RETRYS equals three. Since the value of RETRYS stored in A at step 452 is three, at step 454 the program will branch to step 456, at which point it tests the READFLAG variable to determine whether the tape has been previously read. In this case, since it was assumed that the tape was previously read, the value of the READFLAG variable is not zero, and the program branches to the positioned too far step 212.

At the positioned too far step 212, the magnetic head is moved to the previous track, which is track 4, at step 440. At step 442, the value of RETRYS is tested to determine whether it is equal to three, which indicates that the program branched to the positioned too far step 212 from the no data detected step 210. n this case, since the program never calculated a new distance for track 5, step 444 is skipped, and the contents of the NEWDIST variable, which were calculated to be 4,939 for the position of the head on track 4, reflect the approximate distance from the target data block.

This distance is only approximate since the magnetic tape was advanced by a length equal to approximately 34 data blocks during the timeout period of step 364. However, this 34 block difference is of little consequence since the program branches to the final positioning step, and does not branch to the change track step 220 to make any more track changes based upon the new distance.

When the program branches to step 214 from the positioned too far step 212, the magnetic head is positioned on track 4 at a point approximately 34 data blocks to the right of position A4 shown in FIG. 22. This position, which is not shown in FIG. 22, corresponds to the location of data block 40,028. At the branch to final positioning step 214, the program branches to the fine positioning step 206 since NEWDIST, which is equal to 4,939, is positive.

During the fine positioning step 206, at step 420 the program will retrieve the address of the data block to which the head is positioned, which in this case is 40,029, since the tape must be accelerated across the head for one data block. At step 422, the ACTUAL position of the head, which is 40,029, will be compared to TARGET, which in this case is 45,000, and since they are not equal, the program will branch to step 428 to make sure that ACTUAL is less than TARGET and thus that the tape does not have to be rewound to locate the selected data block. Steps 420–424 and 428 repeat until the head detects the data block having the block number of 45,000. When this occurs, the READFLAG is set to one since the magnetic tape has been read, and the program exits since it has found the target data block.

In the foregoing example, a minor effect caused by the use of the dual read heads 58, 60 was ignored for purposes of simplification. As shown in FIG. 5, the two read heads are spaced horizontally apart. One of the read heads 58, 60 is used to read data on the even-numbered tracks and the other of the read heads is used to read data on the odd-numbered data tracks. As a result, the data blocks that are read during the track-to-track portion of the search are not vertically aligned as shown in FIG. 22, but are instead slightly "staggered" by the distance between the two read heads 58, 60. However, this simplification for purposes of the above example should not affect the understanding of the invention.

Standard Serpentine Recording

One of the features of the present invention is that it locates a selected data block without requiring a specially formatted tape. Since no specially formatted tape is required, a tape drive in accordance with the present invention will be able to locate selected data blocks on magnetic tapes that were recorded in standard serpentine fashion prior to the present invention.

Figure 23:
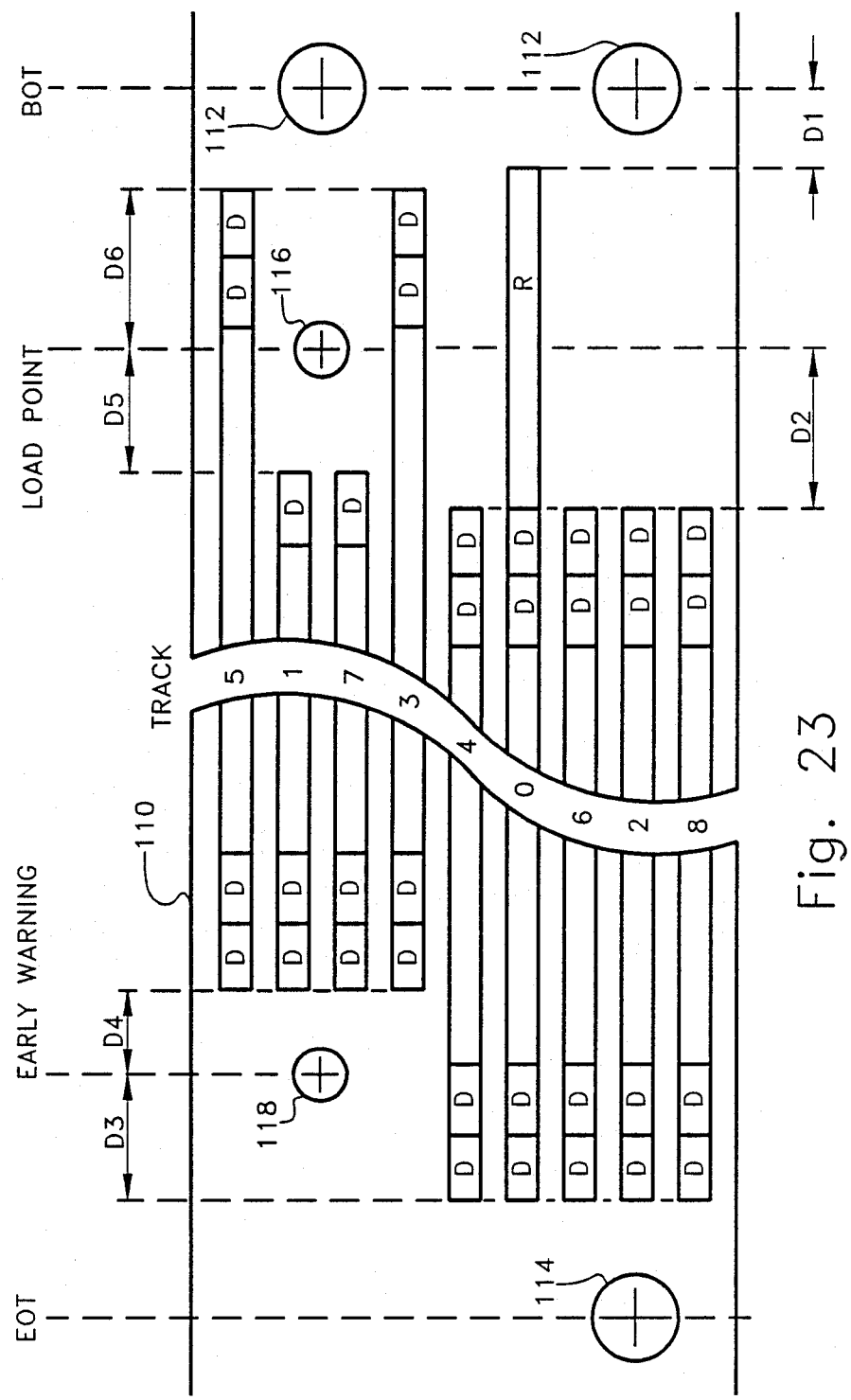
FIG. 23 is an illustration of a portion of magnetic tape recorded in standard serpentine fashion.

Now referring to FIG. 23, a portion of magnetic tape 110 is shown recorded in typical serpentine fashion. The magnetic tape 110 includes two beginning-of-tape (BOT) holes 112 and one end-of-tape (EOT) hole 114. The presence of the holes 112, 114 may be detected by one or more photoelectric sensors to indicate to a tape drive that the beginning or end of the tape has been reached.

The tape 110 includes a load point hole 116 and an early warning hole 118 which when detected, give the tape drive advance notice that the beginning of tape or the end of tape, respectively, is about to be reached.

The tape 110 includes nine data tracks numbered 0 through 8. Each of the data tracks includes a plurality of data blocks D. A reference burst R is prepended to the beginning of data track 0. A number of dimensions labeled D1 through D6 in FIG. 23 are specified in Table 7 below. The dimensions D1 through D6 are variable and may have any values between the minimum (MIN) and maximum (MAX) values set forth in inches in Table 7 below.

TABLE 7

| DIMENSION | MIN | MAX | DESCRIPTION |
| --- | --- | --- | --- |
| D1 | 0 | 15 | BOT to Start-of-Track Reference Burst |
| D2 | 3 | 4 | Load Point to End-of-Track Reference Burst and Start of Preamble on Even Tracks |
| D3 | — | 36 | Early Warning to End of Data on Even Tracks |
| D4 | 1 | 2 | Early Warning to Start of Preamble on Odd Tracks |
| D5 | 0.1 | 4 | End of Data to Load Point on Tracks 1 & 7 |
| D6 | — | 27 | Load Point to End of Data on Tracks 3 & 5 |

Figure 24:
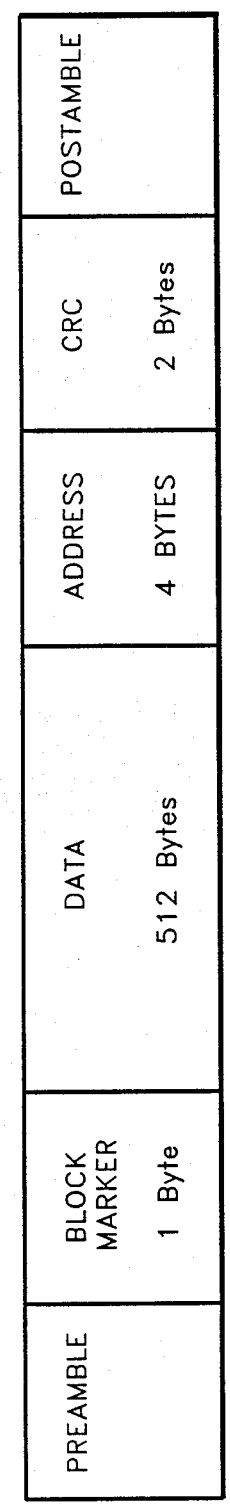
FIG. 24 is an illustration of a data block of FIG. 23 in which various data fields are included.

Now referring to FIG. 24, the contents of one of the data blocks D of FIG. 23 is shown. Each of the data blocks D includes a variable-length preamble, a one-byte block marker, 512 bytes of data, a four-byte address, which is the block number of the data block used by the invention, two bytes of cyclic-redundancy-check (CRC) data, and a variable-length postamble. The data blocks shown in FIG. 23 are recorded serially on the data tracks on the tape without any interblock servo patterns, or other timing or synchronization data.

The typical serpentine recording described above in connection with FIGS. 23 and 24 is in accordance with industry-standard specifications for tapes used in streaming tape drives. These industry-standard specifications have been approved by the QIC Committee, the industry group responsible for approving standards, and are set forth in the following publicly available documents: (1) The QIC-24 standard set forth in the document entitled "Proposed Standard For Data Interchange On Streaming ¼" Magnetic Tape Cartridges Using Group Code Recording At 10,000 FRPI"; 2) the QIC-120 standard set forth in the document entitled "Serial Recorded Magnetic Tape Cartridge For Information Interchange, 15 Track, 0.250 Inch [6.30 MM], 10,000 BPI [394 BPMM], Streaming Mode Group Code Recording"; 3) the QIC-150 standard set forth in the document entitled "Serial Recorded Magnetic Tape Cartridge For Information Interchange, 18 Track, 0.250 Inch [6.30 MM], 10,000 BPI [394 BPMM], Streaming Mode Group Code Recording"; and 4) the QIC-320 standard set forth in the document entitled "Serial Recorded Magnetic Tape Cartridge For Information Interchange [26 racks, 20,000 FTPI, GCR, ECC]". The documents referred to in 1) through 4) immediately above are incorporated herein by reference, and copies of the same are available from Freeman Associates, Inc., 311 East Carrillo Street, Santa Barbara, Calif. 93101.

The QIC-24 standard described above, which has also been approved by the American National Standards Institute (ANSI), is ANSI standard X3.136-1986 and is set forth in the ANSI document entitled "Serial Recorded Magnetic Tape Cartridge For Information Interchange, 4 and 9 Track, 0.25 Inch [6.30 MM], 8,000 BPI [315 BPMM], Streaming Mode Group Code Recording," which document is also incorporated herein by reference.

For purposes of interpreting the claims appended hereto, the term "standard" used in connection with the manner in which a tape is recorded shall mean serpentine recording in which each data block on the magnetic tape has a unique block number, with the data blocks arranged in numerically increasing order.

Many modifications and alternative embodiments of the invention will be apparent to those skilled in the art in view of the foregoing description. Accordingly, this description is to be construed as illustrative only, and is for the purpose of teaching those skilled in the art the best mode of carrying out the invention. The details of the structure may be varied substantially without departing from the spirit of the invention, and the exclusive use of all modifications which come within the scope of the appended claims is reserved.

What is claimed is:

1. A streaming tape drive that provides direct addressability of the individual data blocks stored on magnetic tape in serpentine fashion to include a plurality of serpentine data tracks without requiring a sequential search of the entire magnetic tape, said streaming tape drive comprising:

a magnetic head for reading data recorded on magnetic tape in a plurality of serpentine data tracks;
means for moving said magnetic head in a direction transverse to the longitudinal direction of the magnetic tape so that said magnetic head may be positioned to read data from the various data tracks recorded on the magnetic tape; and
means for locating the position of a selected data block, said locating means comprising:

means for performing an initial search for a data track, said initial search being performed by reading the block number of the data block to which said magnetic head is currently positioned, comparing the block number so read with the block number of the selected data block being sought, and moving said magnetic head up or down one data track, depending upon the difference between the block number read and the block number of the selected data block, said initial search terminating upon the magnetic head being positioned to a data track having a data block that is recorded within a predetermined distance of the selected data block being sought; and means for performing a subsequent search for the selected data block being sought, said subsequent search being performed by reading a plurality of data blocks from a point beginning on the data track located as a result of said initial search until the block number of a data block read matches the block number of the selected data block being sought, indicating that said magnetic head has located the selected data block.

2. A streaming tape drive as defined in claim 1 wherein the selected block of data comprises a data sector.

3. A streaming tape drive as defined in claim 1 wherein the selected block of data is on said data track located as a result of said initial search.

4. A streaming tape drive as defined in claim 1 wherein said distance is measured as the difference in block numbers between a data block and the selected data block being sought.

5. A streaming tape drive as defined in claim 1 wherein said means for moving said magnetic head comprises a stepping motor coupled to a lead screw.

6. A streaming tape drive as defined in claim 1 wherein said means for locating the position of a selected data block comprises a microprocessor that executes a computer program.

7. A streaming tape drive as defined in claim 6 wherein said microprocessor comprises an 8031 microprocessor.

8. A method of locating a selected block of data from a plurality of data blocks stored on magnetic tape in serpentine fashion, said method comprising the steps of:
(a) reading the block number of a data block to which a magnetic head is positioned;
(b) comparing the block number read in said step (a) with the block number of a selected data block;
(c) moving the magnetic head up or down one data track, depending upon the numeric difference of the block numbers compared in said step (b);
(d) repeating said steps (a)–(c) until the distance of the magnetic head to the selected block of data is minimized;
(e) after said step (d), reading the block number of a data block and comparing the block number so read with the block number of the selected data block; and
(f) repeating said step (e) for a plurality of data blocks with increasing block numbers until the block number read during said step (e) matches the block number of the selected data block, indicating that the magnetic head has located the selected data block.

9. A method of locating a selected block of data as defined in claim 8 wherein during said step (f), said step (e) is repeated for each adjacent data block recorded on the magnetic tape until the selected data block is located so that the search performed during said step (f) is sequential.

10. A method of locating a data track on magnetic tape recorded in serpentine fashion to include a plurality of serpentine data tracks, said method comprising the steps of:
(a) reading the block number of a data block stored on magnetic tape in serpentine fashion to include a plurality of serpentine data tracks;
(b) comparing the block number read in said step (a) with the block number of a selected data block being sought; and
(c) moving a magnetic head to a different data track on the magnetic tape based upon the difference in the block number read in said step (a) and the block number of the selected data block.

11. A method as defined in claim 10 additionally comprising the step of (d) repeating said step (c).until either the distance of the magnetic head to the selected. data block is minimized or the magnetic head is positioned to a data block that is recorded within a predetermined distance of the selected data block.

12. A method as defined in claim 11 wherein the magnetic head is moved only one data track each time said step (c) is performed.

13. A method as defined in claim 11 wherein said data track in said step (d) to which the magnetic head is positioned contains the selected block of data.

14. A streaming tape drive for locating a selected block of data stored on a magnetic tape recorded in serpentine fashion to include a plurality of serpentine data tracks without a sequential search of the entire magnetic tape, said streaming tape drive comprising:
a magnetic head for reading data from magnetic tape that is recorded in serpentine fashion to include a plurality of serpentine data tracks;
a motor that moves said magnetic head in a direction transverse to the movement of magnetic tape across said magnetic head so that said magnetic head may be positioned to read data from the various serpentine data tracks recorded on the magnetic tape; and
a controller that causes said magnetic head to locate a particular data track by performing a nonsequential search, said controller locating said data track by reading the block number of at least one block of data on magnetic tape.

15. A streaming tape drive as defined in claim 14 wherein said controller compares the block number of the selected data block with the block number of the data block corresponding to the position of said magnetic head to determine whether said magnetic head is positioned on said data track located by said controller.

16. A streaming tape drive as defined in claim 14 wherein said controller comprises a microprocessor.

17. A streaming tape drive comprising:
a magnetic head for reading data from magnetic tape that is recorded in serpentine fashion to include a plurality of serpentine data tracks;
a motor that moves said magnetic head in a direction transverse to the movement of magnetic tape across said magnetic head so that said magnetic head may be positioned to read data from the various serpentine data tracks recorded on the magnetic tape; and a controller that causes said magnetic head to locate the position on magnetic tape of a selected block of data by performing a nonsequential search in which the block numbers of a plurality of data blocks are read and compared to the block number of the selected data block.

18. A streaming tape drive as defined in claim 17 wherein said controller locates the selected block of data by first locating a data track having a block of data stored within a predetermined distance of the selected data block and then by locating the position of the selected block of data by performing a substantially sequential search.

19. A streaming tape drive as defined in claim 18 wherein the selected block of data is on the data track located by said controller.

20. A streaming tape drive that provides direct addressability of the individual data blocks stored on magnetic tape in serpentine fashion to include a plurality of serpentine data tracks without requiring a sequential search of the entire magnetic tape, said streaming tape drive comprising:

a magnetic head for reading data recorded on magnetic tape in a plurality of serpentine data tracks;

means for moving said magnetic head in a direction transverse to the longitudinal direction of the magnetic tape so that said magnetic head may be positioned to read data from the various data tracks recorded on the magnetic tape; and means for locating the position of a selected data block, said locating means comprising:

means for performing an initial search for a data track, said initial search being performed by reading the block number of the data block in the serpentine data track to which said magnetic head is currently positioned, comparing the block number so read with the block number of the selected data block being sought, and moving said magnetic head to another one of said serpentine data tracks, depending upon the difference between the block number read and the block number of the selected data block; and means for performing a subsequent search for the selected data block being sought, said subsequent search being performed by reading a plurality of data blocks from a point beginning on the serpentine data track located as a result of said initial search until the block number of a data block read matches the block number of the selected data block being sought, indicating that said magnetic head has located the selected data block.

21. A streaming tape drive that provides direct addressability of the individual data blocks stored on magnetic tape in serpentine fashion to include a plurality of serpentine data tracks without requiring a sequential search of the entire magnetic tape, said streaming tape drive comprising:

a magnetic head for reading data recorded on magnetic tape in a plurality of serpentine data tracks;

a stepping motor for moving said magnetic head in a direction transverse to the longitudinal direction of the magnetic tape so that said magnetic head may be positioned to read data from the various data tracks recorded on the magnetic tape;

a data memory coupled to said magnetic head for storing the block number of a data block read by said magnetic head, said memory also storing the block number of the selected data block being sought;

a comparator coupled to said memory and to said stepping motor for comparing the block number so read with the block number of the selected data block being sought and causing said stepping motor to move said magnetic head to another one of said serpentine data tracks, depending upon the difference between the block number read and the block number of the selected data block; and a tape drive motor coupled to said comparator for moving said magnetic tape longitudinally past said magnetic head until the block number of a data block read matches the block number of the selected data block being sought, indicating that said magnetic head has located the selected data block.

22. A streaming tape drive that provides direct addressability of the data blocks stored on a magnetic tape in standard serpentine fashion to include a plurality of serpentine data tracks without a sequential search of the entire length of the tape, said tape drive comprising:

a magnetic head for reading data from magnetic tape that is recorded in standard serpentine fashion to include a plurality of serpentine data tracks; a controller that provides direct addressability of the blocks of data stored on magnetic tape that is recorded in standard serpentine fashion, said direct block addressability providing for the retrieval of a single selected block of data, said controller locating the selected block of data by performing a nonsequential search of the magnetic tape.

23. A streaming tape drive that provides direct addressability of the data blocks stored on a magnetic tape in serpentine fashion to include a plurality of serpentine data tracks without a sequential search of the entire length of the tape, said tape drive comprising:

a magnetic head for reading data from magnetic tape that is recorded in serpentine, fashion to include a plurality of serpentine data tracks of data blocks recorded without the requirement of interblock servo patterns; a controller that provides direct addressability of the blocks of data stored on magnetic tape that is recorded in serpentine fashion, said direct block addressability providing for the retrieval of a single selected block of data, said controller locating the selected block of data by performing a nonsequential search of the magnetic tape.

24. A method of locating a selected block of data from a plurality of data blocks stored on magnetic tape in standard serpentine fashion to include a plurality of serpentine data tracks, said method comprising the steps of:

(a) first performing a nonsequential search of magnetic tape recorded in standard serpentine fashion in order to locate a particular data track; and (b) then performing a substantially sequential search of the magnetic tape in order to determine the position of the selected data block.

25. A method as defined in claim 24 wherein said step (a) includes the steps of:

(c) comparing the block number of the selected block of data with the block number of a block of data corresponding to the position of a magnetic head; and (d) moving a magnetic head to a different data track of the magnetic tape based upon the difference between the block numbers compared in said step (c).

26. A method as defined in claim 24 additionally comprising the step (c) of rewinding the magnetic tape a predetermined distance after said step (a) but before said step (b) when the magnetic head is positioned to a data block having a block number greater than the block number of the selected data block at the completion of said step (a).

* * * * *

UNITED STATES PATENT AND TRADEMARK OFFICE
CERTIFICATE OF CORRECTION

PATENT NO. : 4,858,039

DATED : August 15, 1989

INVENTOR(S) : Roger G. Mintzlaff

It is certified that error appears in the above-identified patent and that said Letters Patent is hereby corrected as shown below:

In Column 3, at line 22, change "schematically FIG. 6;" to --schematically in FIG. 6;--.

In Column 3, at line 27, change "is flow chart a of" to --is a flow chart of--.

In Column 3, at line 32, change "generally FIG." to --generally in FIG.--.

In Column 3, at line 41, change "FIG. 17 a" to --FIG. 17 is a--.

In Column 8, at line 13, change "MD0 MD7" to --MD0-MD7--.

In Column 11, at line 14, change "the bloc number" to --the block number--.

In Column 20, at line 36, change "the target block" to --the target data block--.

In Column 25, at line 63, change "46.0-464" to --460-464--.

In Column 26, at line 27, change "step 212 from" to --step 212 from--.

In Column 27, at line 59, change "5!2 bytes" to --512 bytes--.

In Column 28, at line 21, change "[26 racks" to --[26 tracks--.

In Column 30, at lines 24 and 25, change "selected. data" to --selected data--.

UNITED STATES PATENT AND TRADEMARK OFFICE
CERTIFICATE OF CORRECTION

PATENT NO. : 4,858,039

DATED : August 15, 1989

INVENTOR(S) : Roger G. Mintzlaff

It is certified that error appears in the above-identified patent and that said Letters Patent is hereby corrected as shown below:

In Column 32 at line 42, change "in serpentine, fashion" to --in serpentine fashion--.

Signed and Sealed this

Seventh Day of April, 1992

*Attest:*

HARRY F. MANBECK, JR.

*Attesting Officer*     *Commissioner of Patents and Trademarks*